(12) United States Patent
Tatsumi

(10) Patent No.: US 9,799,108 B2
(45) Date of Patent: Oct. 24, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Eisaku Tatsumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 14/272,322

(22) Filed: May 7, 2014

(65) Prior Publication Data
US 2014/0333649 A1 Nov. 13, 2014

(30) Foreign Application Priority Data
May 8, 2013 (JP) .................................. 2013-098797

(51) Int. Cl.
G09G 5/02 (2006.01)
G06T 5/00 (2006.01)
(Continued)

(52) U.S. Cl.
CPC ........... *G06T 5/009* (2013.01); *G09G 3/2092* (2013.01); *G09G 5/003* (2013.01);
(Continued)

(58) Field of Classification Search
CPC .. G09G 3/36; G09G 3/3406; G09G 2360/144; G09G 2320/0626; G09G 2320/066; G09G 2320/0233; G09G 2320/0606; G09G 3/3413; G09G 2360/145; G09G 3/34; G06T 5/009; G06T 2207/10024; G06T 5/50; G06T 7/0004; G06T 2207/10004; G06T 2207/10064; G06T 2207/10068
See application file for complete search history.

(56) References Cited

U.S. PATENT DOCUMENTS

2001/0043277 A1\* 11/2001 Tanaka ............... H04N 5/23293
                                                        348/333.01
2008/0284719 A1\* 11/2008 Yoshida ............ G02F 1/136277
                                                         345/102
(Continued)

FOREIGN PATENT DOCUMENTS

JP 2006-285063 A 10/2006
JP 2007-248935 A 9/2007
(Continued)

OTHER PUBLICATIONS

Herbert Grosskopf: Der Einfluss der Heligkeit-sempfindung die Bildubertragung Fernseheu, Rundfunktechnische Mitteilungen, Jg. 7, Nr.4, (1963), pp. 205-223.

*Primary Examiner* — James A Thompson
*Assistant Examiner* — Xilin Guo
(74) *Attorney, Agent, or Firm* — Canon U.S.A., Inc. IP Division

(57) ABSTRACT

An image processing apparatus can correct the influence of contrast caused by a difference between a photopic vision and a scotopic vision to provide an image excellent in image quality. An averaged within-visual-field luminance calculation unit calculates a luminance value in the visual field based on at least one of environmental luminance in the visual field and luminance in a screen on which image data can be displayed. A reverse gamma conversion processing unit corrects the contrast of the image data based on the obtained luminance value in the visual field.

19 Claims, 18 Drawing Sheets

(51) Int. Cl.
*G09G 3/20* (2006.01)
*G09G 5/00* (2006.01)

(52) U.S. Cl.
CPC ........... *G09G 2320/0238* (2013.01); *G09G 2320/0276* (2013.01); *G09G 2320/066* (2013.01); *G09G 2320/08* (2013.01); *G09G 2360/144* (2013.01); *G09G 2360/16* (2013.01)

(56) References Cited

U.S. PATENT DOCUMENTS

| | | | | |
|---|---|---|---|---|
| 2009/0128583 | A1* | 5/2009 | Choi | G09G 3/3406 |
| | | | | 345/690 |
| 2011/0050695 | A1* | 3/2011 | Sullivan | G06T 11/001 |
| | | | | 345/426 |
| 2011/0050738 | A1* | 3/2011 | Fujioka et al. | 345/690 |
| 2012/0162532 | A1* | 6/2012 | Oniki | G09G 3/3406 |
| | | | | 348/725 |

FOREIGN PATENT DOCUMENTS

| | | |
|---|---|---|
| JP | 2007-248936 A | 9/2007 |
| JP | 2008-301382 A | 12/2008 |
| JP | 2010-016687 A | 1/2010 |
| JP | 2010-72141 A | 4/2010 |
| JP | 2010-79064 A | 4/2010 |
| JP | 2011-112727 A | 6/2011 |
| JP | 2011-128564 A | 6/2011 |
| JP | 2012-242797 A | 12/2012 |

* cited by examiner

FIG. 8

AVERAGED LUMINANCE WITHIN VISUAL FIELD

WALL SURFACE REFLECTANCE 0.6
SCREEN FIELD RATE 0.4
PEAK LUMINANCE (Cd/m2) 100

| | | | 1 | 3 | 10 | 30 | 100 | 300 | 1000 |
|---|---|---|---|---|---|---|---|---|---|
| | ENVIRONMENTAL LUMINANCE (lux) | | | | | | | | |
| | AVERAGED ENVIRONMENTAL LUMINANCE (Cd/m2) | | 0.19 | 0.57 | 1.91 | 5.73 | 19.10 | 57.30 | 190.99 |
| AVERAGED GRADATION | AVERAGED SCREEN LUMINANCE (Cd/m2) | | | | | | | | |
| 4 | | 0.01 | 0.12 | 0.35 | 1.15 | 3.44 | 11.46 | 34.38 | 114.60 |
| 8 | | 0.05 | 0.13 | 0.36 | 1.17 | 3.46 | 11.48 | 34.40 | 114.61 |
| 16 | | 0.23 | 0.21 | 0.43 | 1.24 | 3.56 | 11.55 | 34.47 | 114.68 |
| 32 | | 1.04 | 0.53 | 0.76 | 1.56 | 3.85 | 11.88 | 34.79 | 115.01 |
| 64 | | 4.78 | 2.03 | 2.25 | 3.06 | 5.35 | 13.37 | 36.29 | 116.50 |
| 128 | | 21.95 | 8.90 | 9.12 | 9.93 | 12.22 | 20.24 | 43.16 | 123.37 |
| 255 | | 100.00 | 40.11 | 40.34 | 41.15 | 43.44 | 51.46 | 74.38 | 154.59 |

IMAGE PROCESSING APPARATUS, IMAGE PROCESSING METHOD, AND STORAGE MEDIUM

BACKGROUND OF THE INVENTION

Field of the Invention

The present application generally relates to image processing and, more particularly, to an image processing technique capable of performing image quality adjustment processing while taking the difference between a photopic vision and a scotopic vision into consideration.

Description of the Related Art

When a user views a display (such as a display screen or a projector screen) in a dark environment, it is conventionally performed to lower the luminance of the display apparatus in such a way as to suppress the glare. Further, it is conventionally feasible for a display device to change a display mode thereof to a cinema mode to realize a low contrast display with low luminance and low color temperature. Further, to lower the resolution in the cinema mode, it is conventionally known to softly adjust the border enhancement.

The above-mentioned correction processing is performed in such a way as to suppress the glare according to eye property or fit to the color temperature whose content has been generated. Further, the above-mentioned correction processing is performed to enable a user to clearly recognize an image even when the image is viewed in a bright environment.

The phenomenon that the working ratio between two visual cells (i.e., cone cell and rod cell) is variable depending on the brightness is generally known eye property. The cone cell is mainly active in a brighter environment and the rod cell is mainly active in a darker environment. The above-mentioned change between the cone cell and the rod cell is generally referred to as "Purkinje".

The cone cell is capable of recognizing the three primary colors: red, green, and blue. The rod cell is capable of recognizing monochrome colors only. Further, the cone cell is different from the rod cell in the central frequency of the sensitivity. More specifically, if the rate of the scotopic vision increases in a darker environment, the color density and the color temperature are differently recognized due to Purkinje transition.

As discussed in Japanese Patent Application Laid-Open No. 2006-285063, Japanese Patent Application Laid-Open No. 2007-248936, and Japanese Patent Application Laid-Open No. 2007-248935, it is conventionally known to correct the color temperature and the color density according to the Purkinje transition. More specifically, as discussed in Japanese Patent Application Laid-Open No. 2006-285063, Japanese Patent Application Laid-Open No. 2007-248936, and Japanese Patent Application Laid-Open No. 2007-248935, the conventional systems perform image processing in such a way as to increase the color temperature and the color density if an environmental luminance and an averaged picture level (APL) are lower than predetermined levels. The APL is an averaged value of the gradation number of image data included in a single frame.

Further, the Bartleson-Breneman effect is known as another eye property, according to which the luminance at which a viewer feels that the brightness reaches a predetermined level is different between a darker environment and a brighter environment. As discussed in Japanese Patent Application Laid-Open No. 2010-72141, it is conventionally known to change a gamma curve according to the Bartleson-Breneman effect with reference to an external environmental luminance. More specifically, the system discussed in Japanese Patent Application Laid-Open No. 2010-72141 uses a gamma curve that enhances the contrast when the external environmental luminance is bright and uses a gamma curve that lowers the contrast when the external environmental luminance is dark. Further, as discussed in Japanese Patent Application Laid-Open No. 2010-79064, it is conventionally known to change the luminance of a screen according to the Bartleson-Breneman effect.

However, as described above, the difference between the cone cell and the rod cell not only influences the recognition of colors (which is referred to as "Purkinje transition", as described above) but also influences the recognition of contrast levels. The techniques discussed in Japanese Patent Application Laid-Open No. 2006-285063, Japanese Patent Application Laid-Open No. 2007-248936, and Japanese Patent Application Laid-Open No. 2007-248935 cannot correct the contrast itself and therefore cannot obtain satisfactory image quality although the color can be corrected and the gain value can be limited.

Further, it is known that the dynamic range of an eye is widened when the external environment is dark. For example, a contrast ratio of 1000:1 is sufficient when the external environment is bright. On the other hand, the contrast ratio required when the external environment is dark is a contrast ratio of 10000:1. In other words, when the external environment is dark, it is necessary to enhance the contrast by expanding the darkness of a dark section. However, according to the technique discussed in Japanese Patent Application Laid-Open No. 2010-72141, the contrast rather decreases when the external environment is dark.

Further, according to the technique discussed in Japanese Patent Application Laid-Open No. 2010-72141, the screen luminance is decreased when the external environment is dark, and therefore the contrast decreases. In other words, the adjustment processing performed in this case is opposite to the processing performed in such a way as to enhance the contrast when the external environment is dark. Further, recently, a viewer tends to be positioned closer to a display apparatus that has a large screen. Therefore, the viewer is greatly influenced by a displayed image. The influence of the displayed image is comparable to or rather greater than the influence from the environment. In the technique discussed in Japanese Patent Application Laid-Open No. 2010-72141, the influence of the screen luminance is not taken into consideration. Therefore, the system will lower the contrast when a bright image is displayed even when the external environment is dark.

SUMMARY OF THE INVENTION

The present disclosure generally relates to a technique capable of correcting the influence of the contrast caused by a difference between the photopic vision and the scotopic vision to provide an image excellent in image quality.

According to an aspect of the present disclosure, an image processing apparatus includes an image acquisition unit configured to acquire image data, a brightness acquisition unit configured to acquire at least one of first brightness information relating to brightness of the image data and second brightness information relating to ambient brightness of a display area in which an image can be displayed based on the image data; a control unit configured to control contrast of the image data acquired by the image acquisition unit, based on the brightness information acquired by the brightness acquisition unit, and a display control unit configured to display an image based on the image data whose contrast has been controlled by the control unit.

Further features of the present disclosure will become apparent from the following description of exemplary embodiments with reference to the attached drawings.

BRIEF DESCRIPTION OF THE DRAWINGS

FIG. 8 is a table illustrating a calculation result with respect to the averaged luminance within the visual field obtained based on a screen edge illuminance and an averaged gradation.

DESCRIPTION OF THE EMBODIMENTS

Hereinafter, various exemplary embodiments, features, and aspects of the disclosure will be described in detail below with reference to the drawings.

Figure 1:
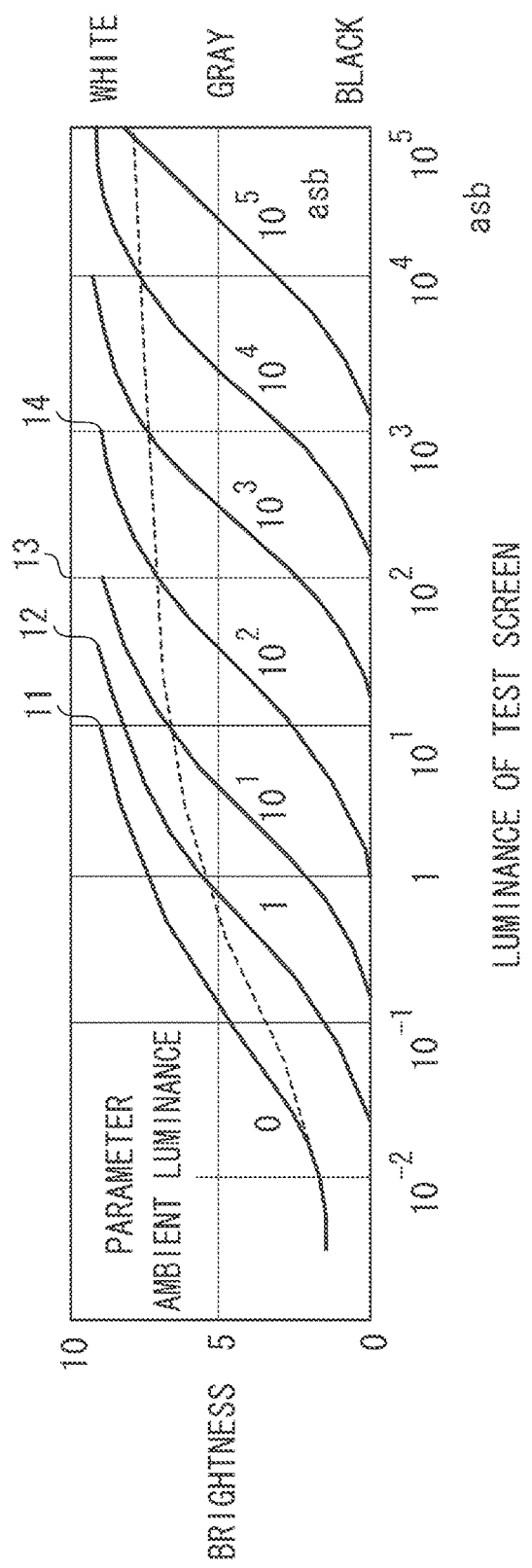
FIG. 1 is a graph illustrating an evaluation result with respect to senses of brightness at various ambient luminance levels.

First, variation of the feeling of brightness depending on human visual property in various environmental luminance levels is described in detail below. FIG. 1 is a graph illustrating an evaluation result with respect to the sense of brightness at various ambient luminance levels, which is discussed in Herbert Grosskopf: Der Einfluss der Heligkeitsempfindung die Bildubertragung Fernseheu, Rundfunktechnische Mitteilungen, Jg 7, Nr. 4, (1963), pp 205-223. The Japanese version of the above-mentioned literature is available from NII-Electronic Library Service: The Institute of Image Information and Television Engineers. Vol. 19, No. 5, pp 55-56.

In FIG. 1, the abscissa axis represents the luminance of a test screen and the ordinate axis represents a subjective evaluation value about the feeling of brightness, which is expressed using 10 stages in total. In FIG. 1, the parameter of each curve is the ambient luminance. The unit expressing the ambient luminance is "asb", in which 1 asb=1/π (Cd/m$^2$). In FIG. 1, a first curve 11 represents an evaluation result obtained when the ambient luminance is 0 asb. A second curve 12 represents an evaluation result obtained when the ambient luminance is 1 asb. A third curve 13 represents an evaluation result obtained when the ambient luminance is 10 asb. A fourth curve 14 represents an evaluation result obtained when the ambient luminance is 100 asb.

In the example illustrated in FIG. 1, the evaluation result of the third curve 13 (of 10 asb) corresponds to the viewing environment of a display device (e.g., TV) in an ordinary living room and the evaluation result of the fourth curve 14 (of 100 asb) corresponds to the viewing environment in a bright shop (or office). The third curve 13 and the fourth curve 14 are offset from each other by a distance equivalent to 10 times in the luminance of the test screen. In the present exemplary embodiment, the level 8 with respect to the subjective evaluation value about the feeling of brightness is regarded as a representative bright portion. Further, the level 2 with respect to the subjective evaluation value about the feeling of brightness is regarded as a representative dark portion. The ratio of the subjective evaluation value 8 to the subjective evaluation value 2 is referred to as "contrast ratio". According to the evaluation result illustrated in FIG. 1, the contrast ratio is approximately 100 in each of the third curve 13 and the fourth curve 14. The evaluation result of the second curve 12 corresponds to the viewing environment of the display device in a dimly room. Similar tendency can be recognized with respect to the contrast ratio. On the other hand, the evaluation result of the first curve 11 corresponds to the viewing environment of the display device in a dark room. In this case, the contrast ratio (i.e., the ratio between the subjective evaluation values 2 and 8 about the feeling of brightness) is approximately 1000.

The above-mentioned result reveals that there are two types of human eye cells, namely a cone cell and a rod cell. The cone cell that is active in a brighter environment has a narrow dynamic range. Therefore, the cone cell cannot recognize a dark portion. On the other hand, the rod cell that is active in a darker environment has a wide dynamic range. In other words, the rod cell has excellent sensitivity in an extended area in a darker environment. The rod cell is active in a dark room. The dynamic range of the rod cell is wide. Therefore, it is necessary to enhance the contrast ratio to attain the same rate in brightness. To change the contrast according to a rate of the scotopic vision, it is necessary to check how the switching from the cone cell to the rod cell occurs in response to a change in the brightness.

Figure 2:
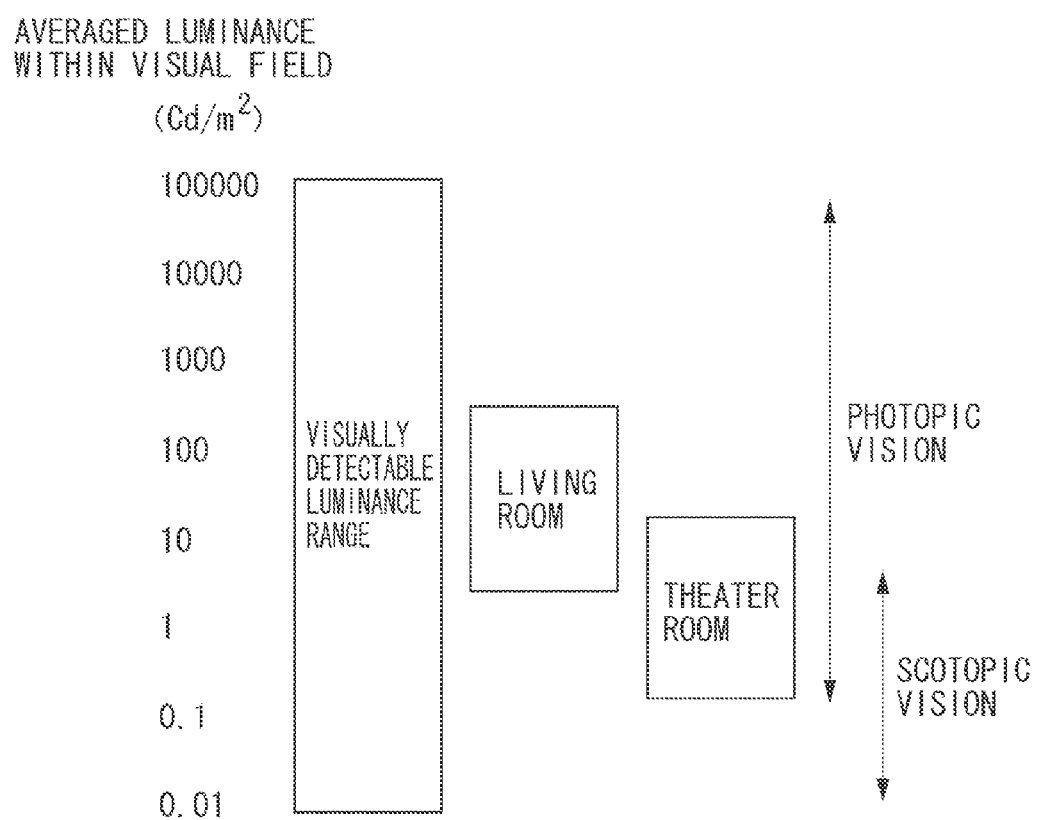
FIG. 2 illustrates operating ranges of a cone cell and a rod cell with respect to an averaged luminance within a visual field.

FIG. 2 illustrates operating ranges of the cone cell and the rod cell with respect to an averaged luminance within the visual field. In FIG. 2, the ordinate axis represents the averaged luminance within the visual field. The visually detectable luminance range (more specifically, the dynamic range of an eye) is $10^6$ to $10^{10}$. On the other hand, when a person is viewing an image on a television set placed in a living room, the averaged luminance within the visual field is in the range from several candelas to several hundreds candelas. Further, when a person is viewing an image projected by a projector placed in a theater room, the averaged luminance within the visual field is in the range from several decimal candelas to several tens candelas.

The luminance range in which the cone cell is active is equal to or greater than 0.1. The luminance range in which the rod cell is mainly active is equal to or less than 10 candelas. Therefore, both of the visual cells are active without causing any saturation in the region from 0.1 to 10 candelas.

The transition from the photopic vision to the scotopic vision is not a switch-like transition, and is rather a composite one that can be realized by a composite vision of the cone cell and the rod cell. If the averaged luminance within the visual field is approximately 1 $Cd/m^2$ at the time when the adaptation of an eye completes, the ratio that influences the sensitivity of the cone cell and the rod cell is approximately 1:1 (i.e., 50% and 50%). Therefore, the person who is present in the theater room is forced to view an image of a composite region of the photopic vision and the scotopic vision. In other words, the person views an image with a composite contrast of both eyes.

Figure 3:
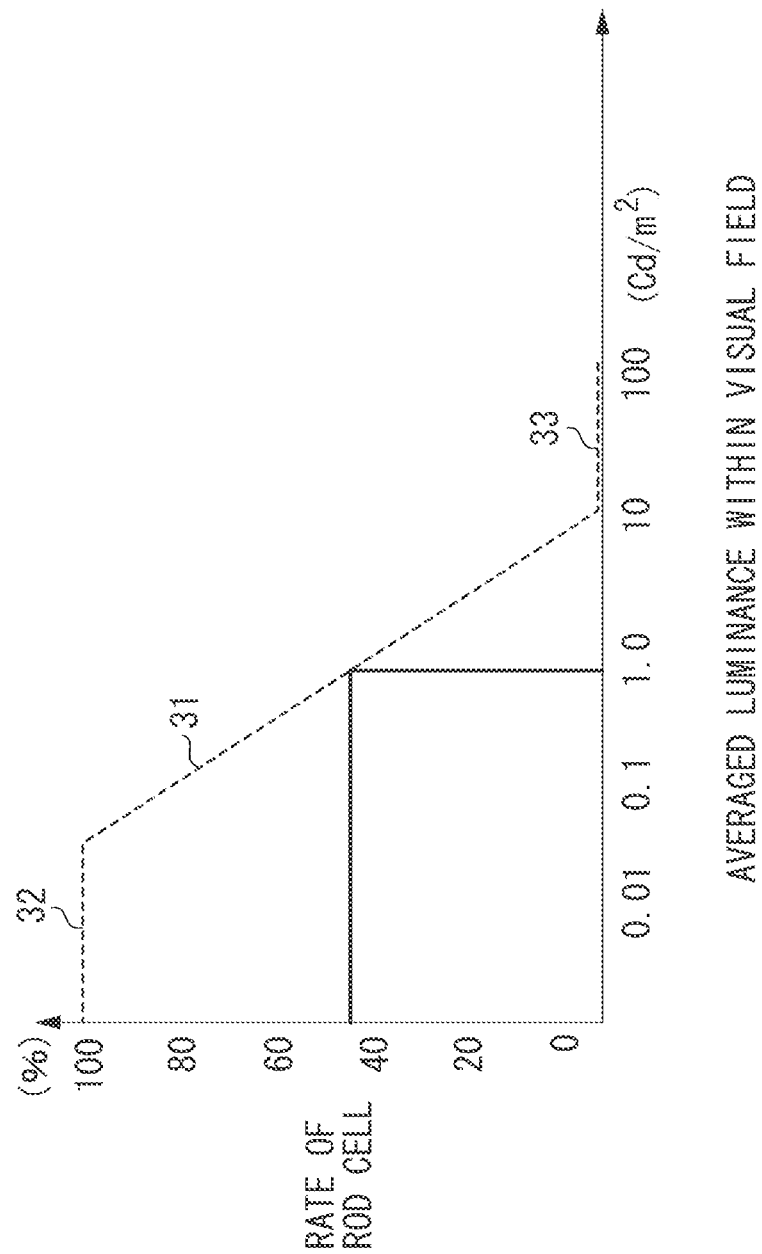
FIG. 3 is a graph illustrating a rate of the rod cell that influences a sensitivity of a composite vision of the cone cell and the rod cell with respect to the averaged luminance within the visual field.

FIG. 3 is a graph illustrating a rate of the rod cell that influences the sensitivity of a composite vision of the cone cell and the rod cell in relation to the averaged luminance within the visual field. In FIG. 3, the abscissa axis represents the averaged luminance within the visual field, and the ordinate axis represents the rate of the rod cell that influences the sensitivity of the composite vision. Further, in FIG. 3, a dotted line 31 indicates the rate of the rod cell that influences the sensitivity of the composite vision when the averaged luminance within the visual field is in the range from 0.1 $Cd/m^2$ to 10 $Cd/m^2$. A dotted line 32 indicates the rate of the rod cell that influences the sensitivity of the composite vision when the averaged luminance within the visual field is equal to or less than 0.1 $Cd/m^2$. A dotted line 33 indicates the rate of the rod cell that influences the sensitivity of the composite vision when the averaged luminance within the visual field is equal to or greater than 10 $Cd/m^2$. When $k(Cd/m^2)$ represents the averaged luminance within the visual field and "s" represents the rate of the rod cell that influences the sensitivity of the composite vision, the above-mentioned lines 31 to 33 can be expressed using the following formula.

$s=1$ in the range of $k<0.1$, $s=1-0.5*\log k$ in the range of $0.1<k<10$, and $s=0$ in the range of $k>10$.

The contrast ratio with respect to the averaged luminance within the visual field can be obtained with reference to FIGS. 1 and 2. When "c" represents the contrast of the photopic vision, the contrast of the scotopic vision is equal to 10c as understood from FIG. 1.

If a contrast "G" of the composite vision of the cone cell and the rod cell is calculated using the rate "s" of the rod cell, a calculation result $G=c(1-s)+10c*s$ can be obtained. If the above-mentioned calculation result is simplified using a relationship $s=1-0.5*\log k$, a simplified calculation result $G=c(1+9s)$ can be obtained.

Figure 4:
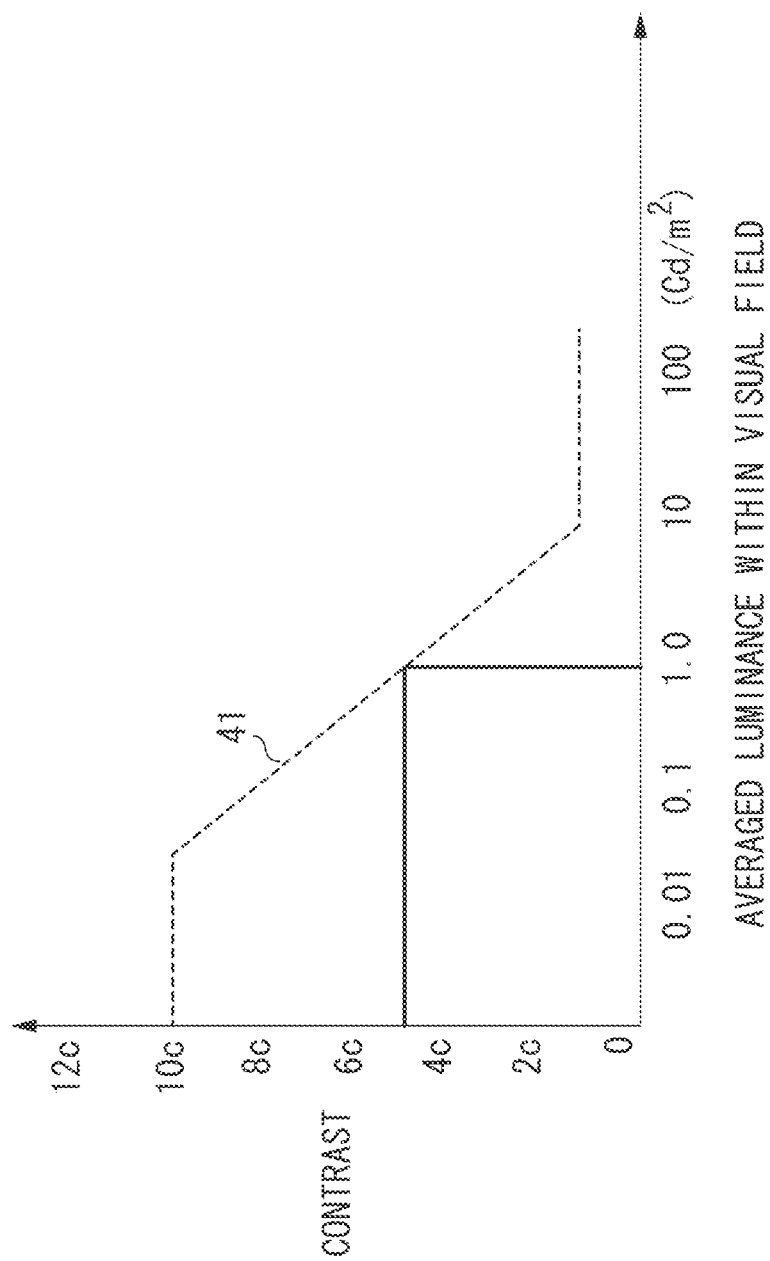
FIG. 4 is a graph illustrating an example of a contrast with respect to the averaged luminance within the visual field.

FIG. 4 is a graph illustrating an example of the contrast with respect to the averaged luminance within the visual field. In FIG. 4, the abscissa axis represents the averaged luminance within the visual field, and the ordinate axis represents the contrast that is required to be felt by an eye as being the same. More specifically, in FIG. 4, a dotted line 41 indicates the contrast that is required to be felt by an eye as being the same with respect to the averaged luminance within the visual field.

The above-mentioned calculations have been performed based on standard evaluation values. However, evaluation values to be actually used are variable depending on each individual person. Therefore, a contrast correction amount may have excessive effects if it is not appropriate for the eye property of a viewer. If contrast correction processing to be performed is too strong, the viewer may feel that the image quality is unnatural rather than appropriate. Therefore, it is useful to set an actual contrast correction amount to be equal to or less than a standard value. For example, the ratio of the actual contrast correction amount to the standard value can be 0.5 or 0.7, more specifically, a value in the range from 0.3 to 0.9.

Figure 5:
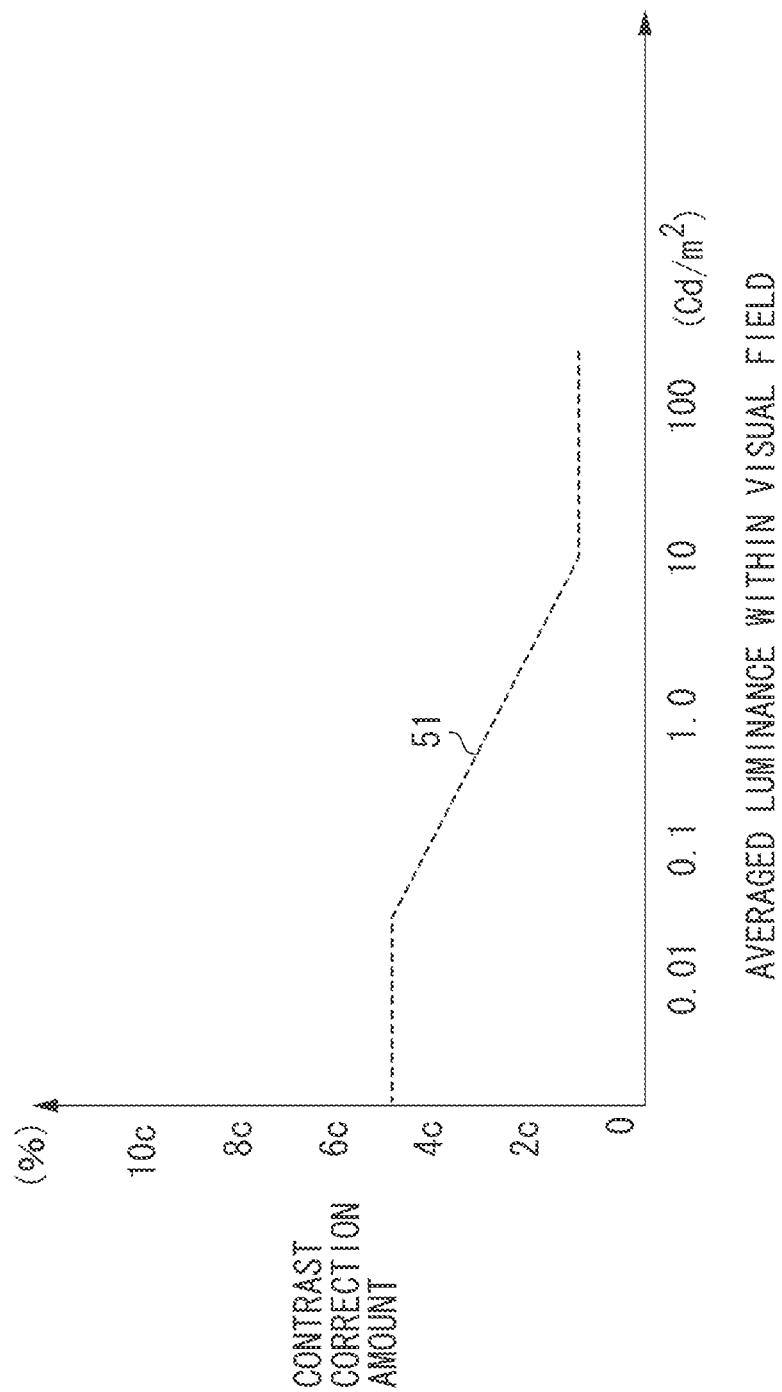
FIG. 5 is a graph illustrating a contrast correction amount with respect to the averaged luminance within the visual field.

FIG. 5 is a graph illustrating an example of the contrast correction amount with respect to the averaged luminance within the visual field. In FIG. 5, the abscissa axis represents the averaged luminance within the visual field, and the ordinate axis represents the contrast correction amount. More specifically, a dotted line 51 indicates the contrast correction amount to be required with respect to the averaged luminance within the visual field. As described above, when the actual contrast correction amount is set to 0.5, it is useful to control the contrast in the range from c (i.e., the original contrast value) to 5c.

An example contrast control method described below is a method characterized by controlling the contrast with reverse gamma values to be used for a reverse gamma conversion table. If gradation values ranging from 0 to 255 are employed as 256 setting values for the reverse gamma conversion table, the table can be classified into three gradation sections of a dark section, a middle section, and a bright section. More specifically, 84 gradation values ranging from 0 to 83 define the dark section. Further, 84 gradation values ranging from 84 to 167 define the middle section. Further, 88 gradation values ranging from 168 to 255 define the bright section. A representative gradation value of each gradation section is an intermediate gradation value thereof. More specifically, the representative gradation value of the dark section is 42. The representative gradation value of the middle section is 127. The representative gradation value of the bright section is 212.

A luminance ratio between the representative gradation value 42 of the dark section and the representative gradation value 212 of the bright section, at a reverse gamma value 2.2, is referred to as contrast "c". A normalized luminance of the gradation value 42 is 0.0189 and a normalized luminance of the gradation value 212 is 0.666. Therefore, the contrast "c" is 35.2 (=0.666/0.0189).

Figure 6:
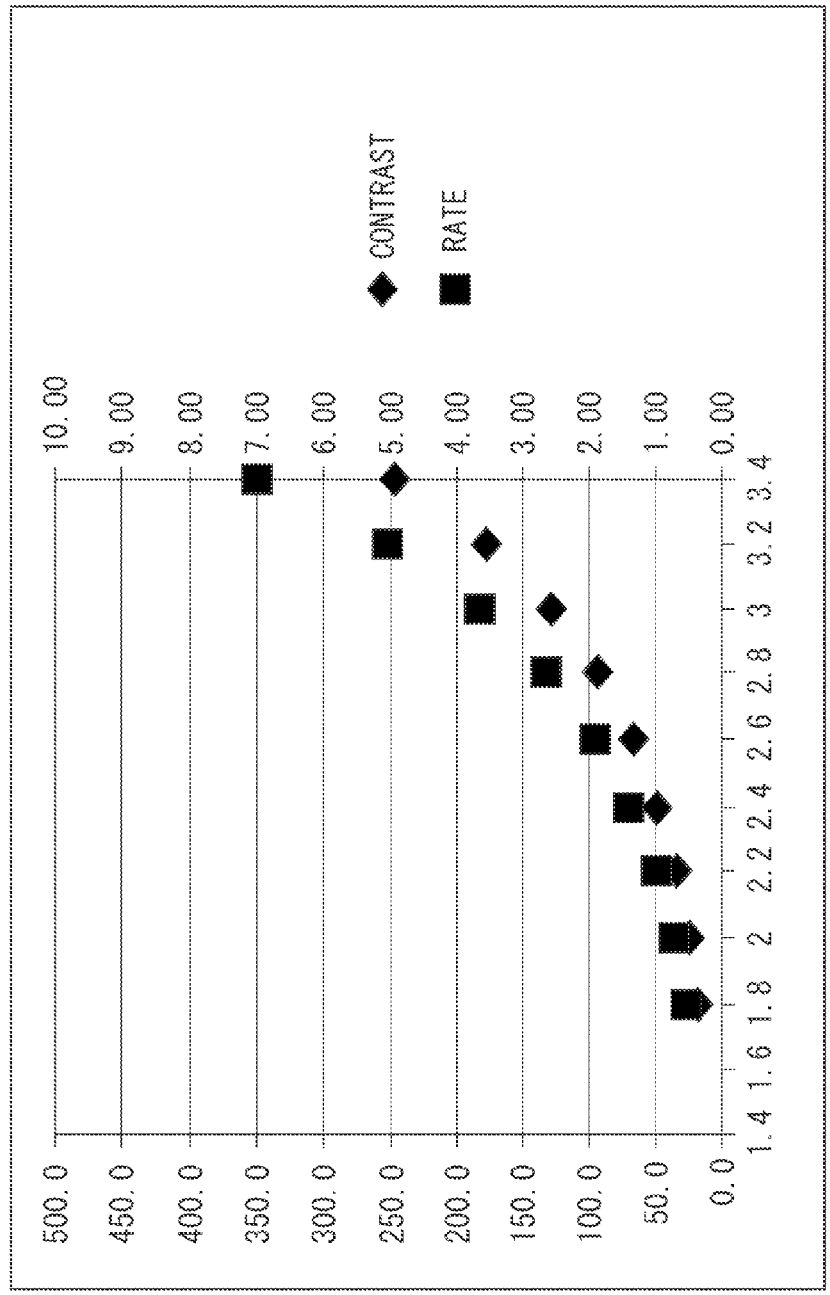
FIG. 6 is a graph illustrating calculation results of the contrast and the ratio of the contrast to a reference contrast at a reverse gamma value 2.2, calculated for various reverse gamma values.

FIG. 6 is a graph illustrating calculation results of the contrast and the ratio of the contrast to a reference contrast at the reverse gamma value 2.2, calculated for various reverse gamma values. In FIG. 6, the abscissa axis represents the reverse gamma value, and the left ordinate axis represents the contrast. The right ordinate axis represents the ratio of the contrast to the reference contrast at the reverse gamma value 2.2. In FIG. 6, the contrast at a reverse gamma value 3.2 is just five times the reference contrast at the reverse gamma value 2.2.

It is understood from FIGS. 5 and 6 that it is useful to change the reverse gamma value stepwise in the range from 2.2 to 3.2 according to the averaged luminance within the visual field to control the contrast in the range from "the same" to "5 times" according to the averaged luminance within the visual field.

Figure 7:
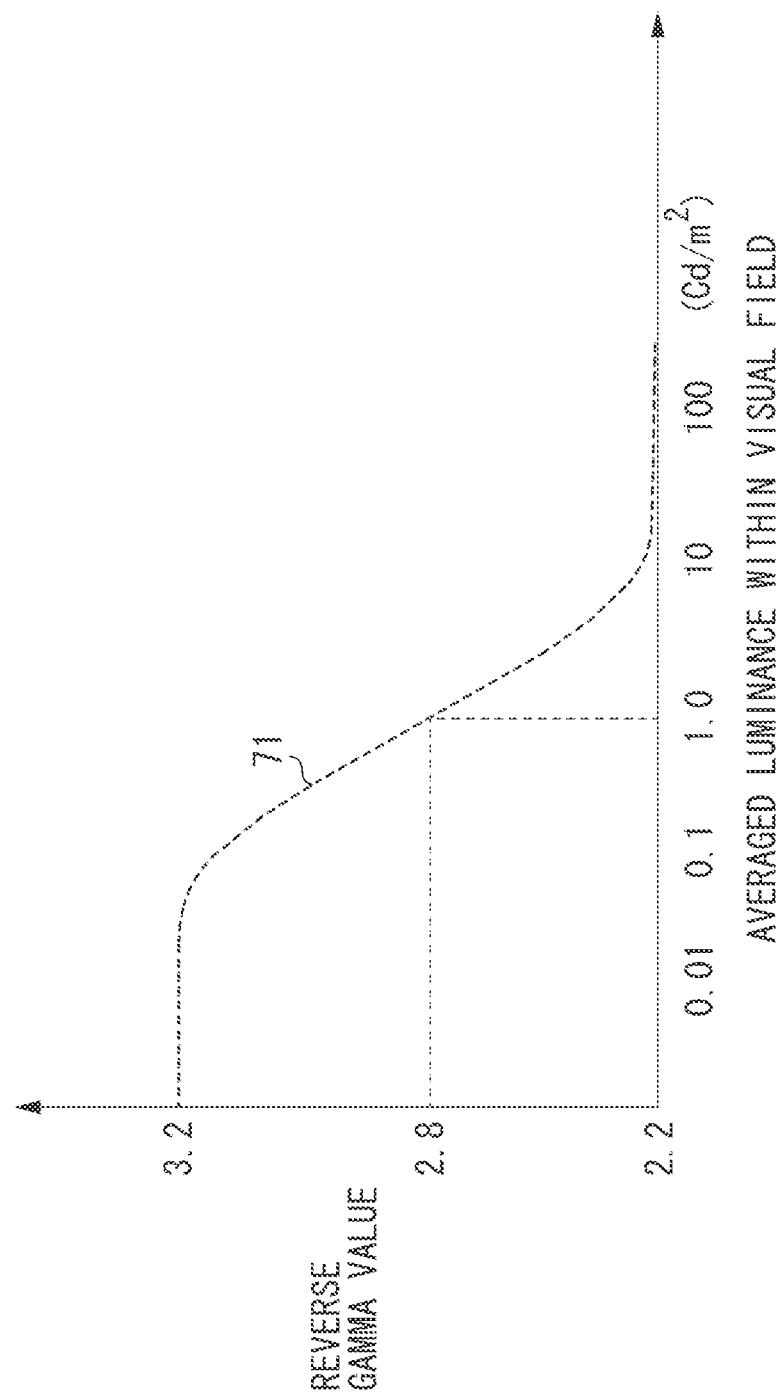
FIG. 7 is a graph illustrating the reverse gamma value with respect to the averaged luminance within the visual field.

FIG. 7 is a graph illustrating the reverse gamma value with respect to the averaged luminance within the visual field. In FIG. 7, the abscissa axis represents the averaged luminance within the visual field, and the ordinate axis represents the reverse gamma value. More specifically, a dotted curve 71 indicates the reverse gamma value to be controlled with respect to the averaged luminance within the visual field. As illustrated in FIG. 7, the reverse gamma value can be controlled in the range from 2.2 to 3.2 according to the averaged luminance within the visual field.

In the case of a display apparatus for consumer use (not for business use), it is rare that the averaged luminance within the visual field becomes equal to or less than 1 $Cd/m^2$. Therefore, it is useful to control the reverse gamma value in the range from 2.2 to 2.8 according to the averaged luminance within the visual field, as illustrated in FIG. 7.

Further, in the case of the display apparatus for consumer use, it may be useful to set an initial value of the reverse gamma value to 2.4 (not 2.2) because the image looks better when the contrast is higher. In this case, the reverse gamma value is offset by an amount of 0.2. The reverse gamma value can be changed in the range from 2.4 to 3.0 according to the averaged luminance within the visual field.

Next, a method for obtaining the averaged luminance within the visual field is described in detail below. The following formula can be used to obtain the averaged luminance within the visual field.

Average luminance within visual field=Averaged environmental luminance (1−Visual field rate of screen)+Average in-screen luminance*Visual field rate of screen Further, the luminance of ambient light that enters the visual field from a wall surface (i.e., from the outside of the screen) can be obtained using the following formula.

Averaged environmental luminance=Illuminance at screen edge/π*Wall surface reflectance The illuminance at the screen edge can be measured by an illuminometer attached to the periphery of the screen of the display apparatus. An appropriate setting value of the wall surface reflectance is 0.8 if the wall color is white, and approximately 0.5 if the wall color is another color. In a case where no setting value is used in the actual environment, an appropriate initial value to be set is approximately 0.6.

Further, immediately reflecting the above-mentioned value to the image quality (i.e., the contrast) in response to a change of the averaged environmental luminance is inappropriate because the image quality will drastically change within a short period of time, and will be visually undesirable. Therefore, it is effective to set an hourly averaged value of approximately 10 seconds.

Next, a method for obtaining the screen field rate is described in detail below. According to the source of FIG. 1, when the viewing angle is 10 degrees, the ratio of the screen to the visual field is 57%. The above-mentioned screen field rate is a value obtained in a case where a viewer gazes at the screen. Therefore, in a case where the viewer does not gaze at the screen, it is appropriate to reduce the above-mentioned screen field rate to approximately half. In this case, it will be appropriate to set the influence of the external illuminance to approximately 0.7 and to set the influence of the in-screen APL to approximately 0.3.

If the angle of view of a display apparatus in the visual field is unknown, it is useful to designate an arbitrary screen field rate (i.e., the influence in the screen) in the range from 0.3 to 0.7. In the present exemplary embodiment, the screen field rate is set to 0.4 as a moderate provisional value.

The averaged in-screen luminance (i.e. APL) can be expressed using the following formula.

Average in-screen luminance=Average linear gradation value of all pixels/full gradation value*Peak luminance Further, immediately reflecting the above-mentioned value to the image quality (i.e., the contrast) in response to a change of the averaged environmental luminance is inappropriate because the image quality will drastically change within a short period of time, and will be visually undesirable. Therefore, it is effective to set an hourly averaged value of approximately 10 seconds.

FIG. 8 is a table illustrating calculation results of the averaged luminance within the visual field obtained based on a screen edge illuminance and an averaged gradation. FIG. 8 illustrates table data calculated on condition that the wall surface reflectance is 0.6, the screen field rate is 0.4, and the peak luminance of the display apparatus is 100 $Cd/m^2$. The screen edge illuminance value ranges from 1 to 1000 Lux. The averaged gradation ranges from 4 to 255 gradation levels. For example, in an environment of 1 Lux that corresponds to a dark room, if the image data has an averaged gradation level of 16 (namely, when the image data is close to black), the averaged luminance within the visual field is 0.21 $Cd/m^2$. On the other hand, in an environment of 100 Lux that corresponds to a living room, if the image data has an averaged gradation level of 128 (namely, when the image data is relatively bright), the averaged luminance within the visual field is 20.24 $Cd/m^2$.

According to the example illustrated in FIG. 8, in an environment in which the screen edge illuminance is equal to or less than 100 Lux, when the averaged gradation of the displayed image data is equal to or less than 140, the averaged luminance within the visual field is equivalent to or less than 10 $Cd/m^2$. In an area in which the luminance is equal to or less than 10 $Cd/m^2$, the contrast can be increased, and the image quality can be improved by the contrast correction according to the present exemplary embodiment.

The reverse gamma values to be employed for the reverse gamma table can be obtained based on a measured value of the screen edge illuminance and an averaged in-screen luminance (APL) of input image data, with reference to the table illustrated in FIG. 8 and the graph illustrated in FIG. 7. For example, when the averaged in-screen luminance of the input image data is 16 in the above-mentioned dark room in which the ambient illuminance is 1 Lux, the averaged luminance within the visual field is 0.21 $Cd/m^2$ as illustrated in FIG. 8. The reverse gamma value is 3.0 as illustrated in FIG. 7. According to the example of the above-mentioned living room, the averaged luminance within the visual field is 20.24 $Cd/m^2$. Therefore, the reverse gamma value is 2.2 (i.e., initial value) as illustrated in FIG. 7.

Figure 9:
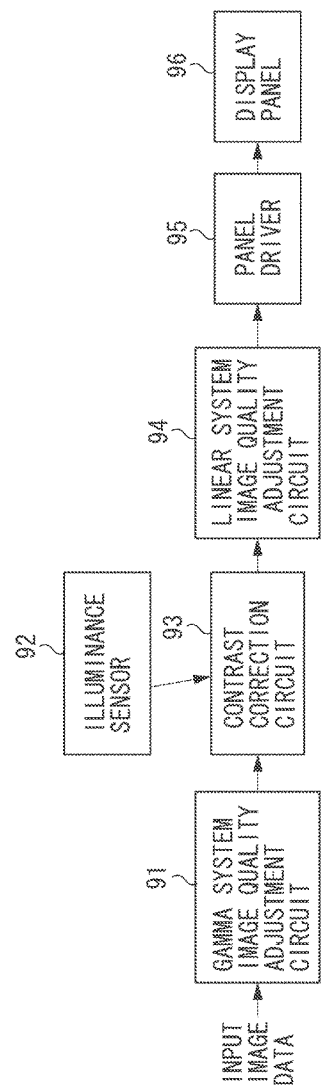
FIG. 9 illustrates a configuration of a display apparatus according to a first exemplary embodiment of the present invention.

Next, a configuration of the display apparatus according to a first exemplary embodiment of the present disclosure is described in detail below. FIG. 9 illustrates a configuration example of the display apparatus according to the first exemplary embodiment. The display apparatus according to the present exemplary embodiment is an image processing apparatus.

In FIG. 9, a gamma system image quality adjustment circuit 91 can perform γ system image processing (including enlargement and contraction) of the gamma system on input image data. An illuminance sensor 92 can generate an illuminance signal. A contrast correction circuit 93 can correct the contrast of the image data output from the gamma system image quality adjustment circuit 91 according to the averaged luminance within the visual field. A linear system image quality adjustment circuit 94 can correct the gradation of the image data output from the contrast correction circuit into linear system image data. A panel driver 95 can convert the image data output from the linear system image quality adjustment circuit 94 into a display panel driving signal. A display panel 96 can display image data based on the display panel driving signal output from the panel driver 95. In general, the above-mentioned input image data can be obtained by decoding an external input signal or a signal received by a tuner. Therefore, a circuit block corresponding to an image input unit is omitted from the illustration of the display apparatus (see FIG. 9).

The above-mentioned input image data is gamma system image data, which is ordinarily multiplied with the gamma value 2.2. The above-mentioned input image data is subjected to the gamma system image processing (including enlargement and contraction) of the gamma system to be performed by the gamma system image quality adjustment circuit 91. An illuminance sensor 92 is provided at the periphery of the display panel 96 to sense the ambient illuminance. The contrast correction circuit 93 calculates an averaged luminance within the visual field based on the image data output from the gamma system image quality adjustment circuit 91 and the illuminance information output from the illuminance sensor 92. Then, the contrast correction circuit 93 performs appropriate contrast correction processing based on the calculated averaged luminance within the visual field. The image data output from the contrast correction circuit 93 is linear system image data. Therefore, the linear system image quality adjustment circuit 94 performs image quality adjustment processing (including edge enhancement processing) of the linear system.

Figure 10:
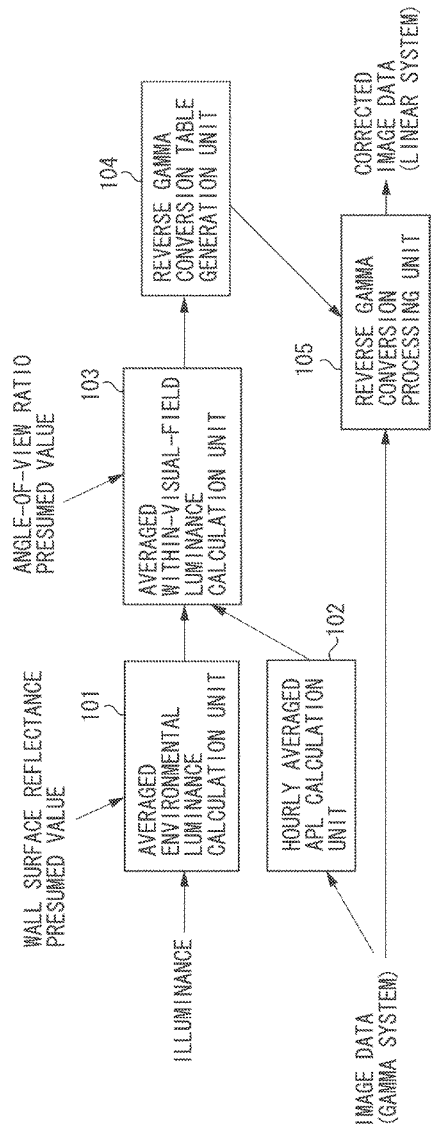
FIG. 10 illustrates a detailed configuration of a contrast correction circuit according to the first exemplary embodiment of the present disclosure.

FIG. 10 illustrates a detailed configuration of the contrast correction circuit 93 according to the first exemplary embodiment of the present disclosure. In FIG. 10, an averaged environmental luminance calculation unit 101 is configured to calculate an averaged environmental luminance based on illuminance information input from the illuminance sensor 92. An hourly averaged APL calculation unit 102 is configured to calculate an averaged in-screen luminance based on image data input from the gamma system image quality adjustment circuit 91. An averaged within-visual-field luminance calculation unit 103 is configured to calculate the averaged luminance within the visual field. A reverse gamma conversion table generation unit 104 is configured to generate a contrast correction reverse gamma conversion table. A reverse gamma conversion processing unit 105 is configured to generate linear system image data having been subjected to contrast correction processed from gamma system image data, using the reverse gamma conversion table generated by the reverse gamma conversion table generation unit 104. As used herein, the term "unit" generally refers to any combination of software, firmware, hardware, or other component that is used to effectuate a purpose.

The averaged environmental luminance calculation unit 101 calculates an hourly averaged environmental luminance in the visual field, based on illuminance information input from the illuminance sensor 92, using the method described with reference to FIG. 8. The hourly averaged APL calculation unit 102 calculates an hourly averaged in-screen luminance in the visual field, based on input image data, using the method described with reference to FIG. 8. The averaged within-visual-field luminance calculation unit 103 generates an hourly averaged luminance within the visual field, based on the averaged environmental luminance, the averaged in-screen luminance, and an angle-of-view ratio presumed value, using the method described with reference to FIG. 8.

The reverse gamma conversion table generation unit 104 generate a reverse gamma conversion table that corresponds to the reverse gamma value based on the hourly averaged luminance within the visual field, using the method described with reference to FIG. 7. The reverse gamma conversion table is described in detail below with reference to FIG. 11. The reverse gamma conversion processing unit 105 performs contrast correction processing by using various reverse gamma values in converting the input image data from gamma system image data to linear system image data. The configuration of the averaged environmental luminance calculation unit 101 is an example of an environmental luminance calculation unit. The configuration of the hourly averaged APL calculation unit 102 is an example of an in-screen luminance calculation unit. The configuration of the averaged within-visual-field luminance calculation unit 103 is an example of a luminance calculation unit.

If the switching of the reverse gamma conversion table is performed before completing the processing of a frame of input image data, a feeling of interference may occur on the displayed image data. Therefore, it is useful to prepare two reverse gamma conversion tables. For example, it is useful to prepare a reverse gamma conversion table to be used in the processing of the present input image data and a rewritten reverse gamma conversion table to be used in the contrast correction processing, which are to be switched at frame synchronization timing.

To realize each constituent component illustrated in FIG. 10, a central processing unit (CPU) (not illustrated) can read a program together with associated data from an appropriate storage medium, such as a read only memory (ROM), and can execute the program. Alternatively, the configuration illustrated in FIG. 10 can be constituted as a hardware device.

Figure 11:
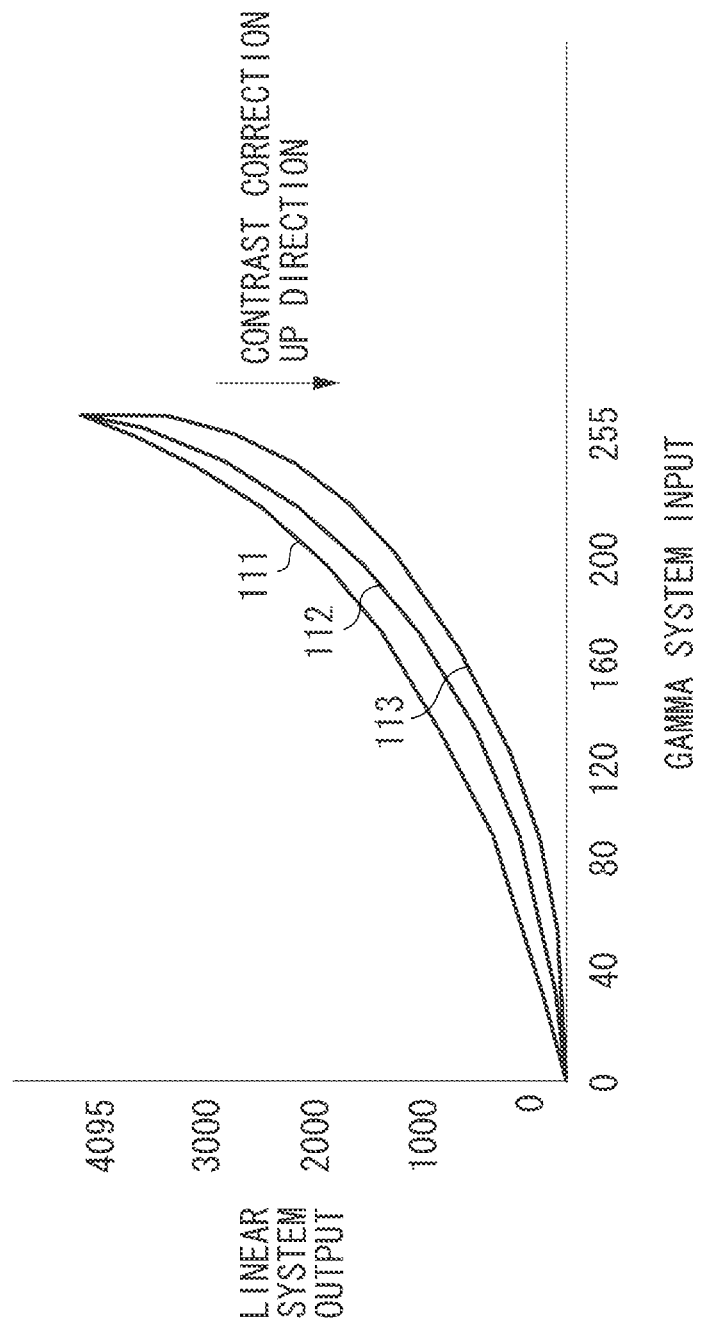
FIG. 11 is a graph illustrating details of a reverse gamma conversion table according to the first exemplary embodiment of the present disclosure.

FIG. 11 is a graph illustrating details of the reverse gamma conversion table. In FIG. 11, the abscissa axis represents a 256 gradation scale of an input gamma system gradation. The ordinate axis represents a 4096 gradation scale of an output linear system gradation. Further, in FIG. 11, a first curve 111 indicates a reverse gamma conversion table corresponding to the reverse gamma value 2.2 (i.e., initial value). A second curve 112 indicates a reverse gamma conversion table corresponding to a reverse gamma value 2.4. A third curve 113 indicates a reverse gamma conversion table corresponding to a reverse gamma value 2.8.

According to the graph illustrated in FIG. 11, when a gradation value of the gamma system gradation defined by the 256 gradation scale is input, a corresponding gradation value of the linear system gradation defined by the 4096 gradation scale is output according to the reverse gamma value.

To perform the contrast correction processing in such a way as to enhance the contrast in response to a reduction of the averaged luminance within the visual field, the contrast can be increased by changing the reverse gamma value from 2.2 (i.e., initial value) to 2.4 or 2.8. For example, when the input gradation value is a representative dark section gradation value 42, the gradation value to be output at the reverse gamma value 2.2 is a gradation value 77. The gradation value to be output at the reverse gamma value 2.4 is a gradation value 54. The gradation value to be output at the reverse gamma value 2.8 is a gradation value 26. Further, when the input gradation value is the representative bright section gradation value 212, the gradation value to be output at the reverse gamma value 2.2 is a gradation value 2728. Further, the gradation value to be output at the reverse gamma value 2.4 is a gradation value 2629. The gradation value to be output at the reverse gamma value 2.8 is a gradation value 2441. When the ratio between the representative bright section gradation value and the representative dark section gradation value is referred to as "contrast", the contrast takes a numerical value of 35 at the reverse gamma value 2.2. Further, the contrast takes a numerical value of 49 at the reverse gamma value 2.4, and the contrast takes a numerical value of 94 at the reverse gamma value 2.8. As mentioned above, the contrast can be changed by changing the reverse gamma value (i.e., the reverse gamma conversion table).

Figure 12:
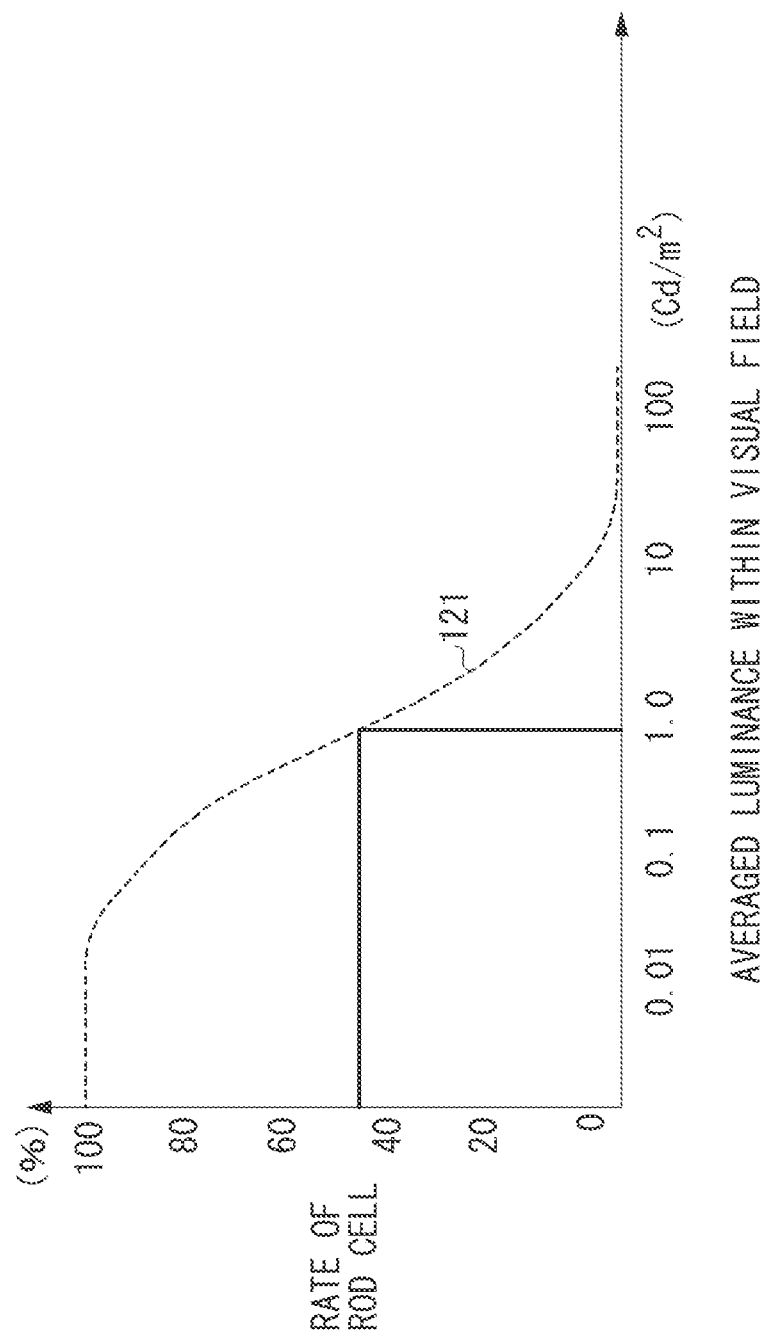
FIG. 12 is a graph illustrating a ratio between the rod cell and the cone cell being characterized in such a way as to be saturated roundly at 0.1 Cd/m$^2$ and 10 Cd/m$^2$.

In the first exemplary embodiment, the calculation of a correction contrast is performed using the ratio between the rod cell and the cone cell on the assumption that the ratio between the rod cell and the cone cell linearly changes in the range from 0.1 to 10 Cd/m² as illustrated in FIG. 3. The above-mentioned method is advantageous in that the calculation is simple. It is unnatural that the visual property is saturated discontinuously at 0.1 Cd/m² and 10 Cd/m². In view of the foregoing, FIG. 12 illustrates a graph characterized in that the ratio between the rod cell and the cone cell is saturated roundly at 0.1 Cd/m² and 10 Cd/m².

The example illustrated in FIG. 3 has been described on the assumption that the ratio between the rod cell and the cone cell linearly changes in the range from 0.1 to 10 Cd/m². On the other hand, the example illustrated in FIG. 12 is characterized in that the ratio between the rod cell and the cone cell changes roundly at 0.1 Cd/m² and 10 Cd/m². More specifically, in FIG. 12, a curve 121 indicates the rate of the rod cell that influences the sensitivity of the composite vision changing roundly in the range from 0.01 to 100 Cd/m² of the averaged luminance within the visual field.

Although the rod cell has been described as having a contrast value "10 times" in the example illustrated in FIG. 1, the contrast value of the rod cell is not limited to "10 times" and can be any value in the range from approximately 3 to 10 times. Therefore, if the rate of the rod cell is expressed using table values representing the curve illustrated in FIG. 12 while the contrast ratio of the rod cell to the cone cell is set to 6 times, it is feasible to obtain a contrast correction curve that is moderate compared to the example illustrated in FIG. 4, as illustrated in FIG. 13.

Figure 13:
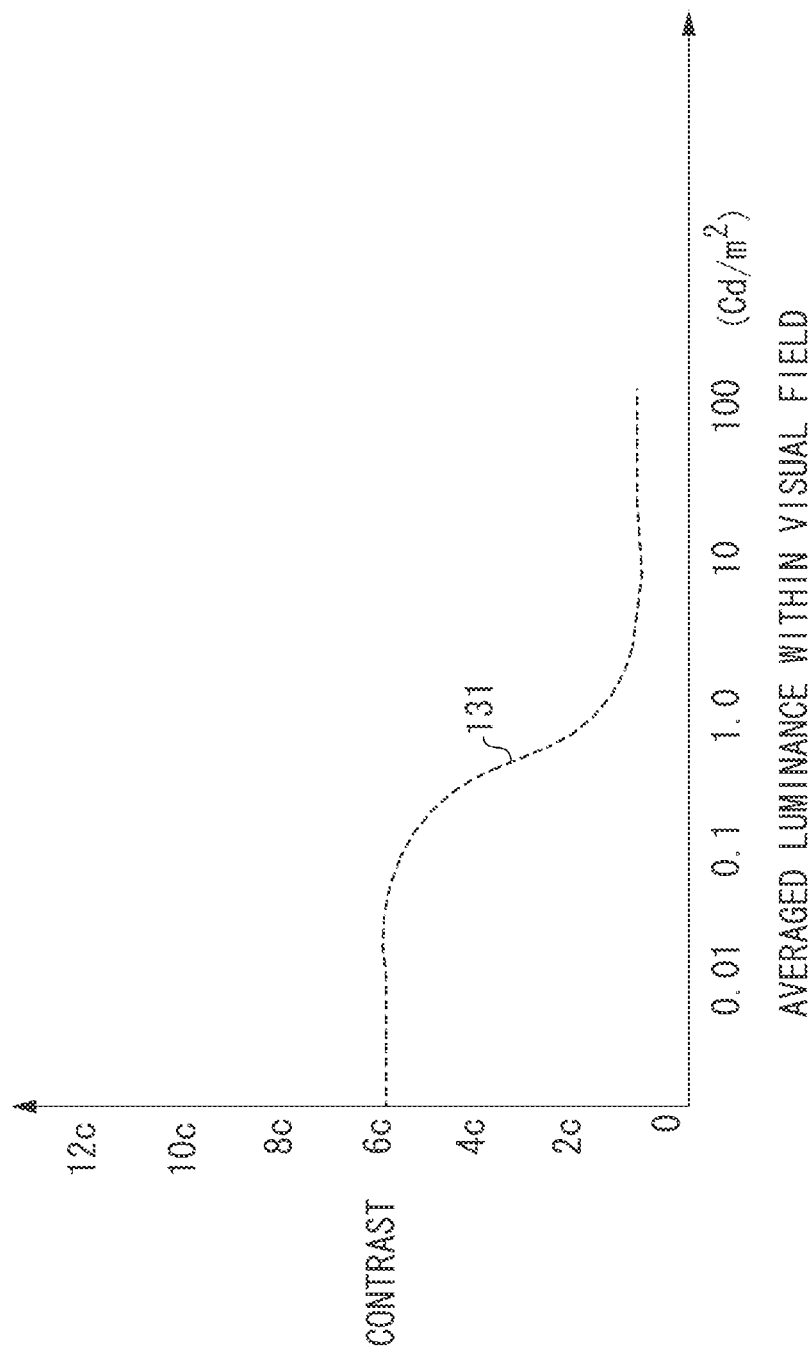
FIG. 13 is a graph illustrating another example of the contrast with respect to the averaged luminance within the visual field.

FIG. 13 illustrates another example of the contrast with respect to the averaged luminance within the visual field. In FIG. 13, the abscissa axis represents the averaged luminance within the visual field, and the ordinate axis represents the contrast that is required to be felt by an eye as being the same. In FIG. 13, a dotted curve 131 indicates the contrast that is required to be felt by an eye as being the same in relation to the averaged luminance within the visual field. If the rate of the rod cell based on table values representing the curve illustrated in FIG. 12 is used, the contrast varies in curved manner in accordance with the averaged luminance within the visual field as illustrated in FIG. 13. A method for correcting the above-mentioned contrast is similar to the above-mentioned method, and therefore redundant description thereof will be avoided.

In the first exemplary embodiment, regarding the influence of the viewing environment and the brightness of an image, it becomes feasible to correct not only the brightness of the screen and color temperature but also the contrast. More specifically, it becomes feasible for a viewer to view an image that is not influenced by a reduction of the sense of contrast that may occur due to the scotopic vision in a darker environment or when the viewer views an image displayed on a dark screen. Accordingly, when the viewer views a bright image or a dark image in the viewing environment that is bright or dark, the viewer can feel that the contrast remains the same.

Hereinafter, a display apparatus having a small screen according to a second exemplary embodiment is described in detail below. When a television set has a small screen whose size is equal to or less than 30 inches, the influence of the luminance of the screen is smaller in the visual field and the influence of the ambient illuminance is dominant. In such a case, the process of obtaining an averaged in-screen luminance from input image data can be omitted. Instead, the illuminance sensor 92 obtains an averaged environmental luminance. The averaged environmental luminance obtained by the illuminance sensor 92 can be directly used as the averaged luminance within the visual field. In other words, a contrast correction circuit according to the second exemplary embodiment does not require the hourly averaged APL calculation unit 102 illustrated in FIG. 10. Therefore, the circuit configuration according to the second exemplary embodiment contributes to cost reduction.

Hereinafter, an example of a projector according to a third exemplary embodiment is described in detail below. When the projector projects a content to be displayed, it is feasible to obtain an estimated value of the illuminance in the visual field based on a projection mode that corresponds to the type of the content to be projected. For example, it is usual that the projector is used in a dark room when the projector displays a movie image. On the other hand, the projector is often used in a conference room that is not so dark when the projector displays image data input from a personal computer (PC). Therefore, for example, when the projection mode is a theater mode to be selected when the projector displays a movie image, the illuminance can be estimated as being 10 Lux. When the projection mode is a conference mode or a power mode (although the mode name may be differently used for individual projector) to be selected when the projector displays image data input from the PC, the illuminance can be estimated as being 100 Lux. Further, it is useful that each user directly designates the illuminance in the visual field. Accordingly, the display apparatus according to the third exemplary embodiment does not require the illuminance sensor 92 illustrated in FIG. 9. Therefore, the apparatus configuration according to the third exemplary embodiment contributes to cost reduction because of unnecessity of the illuminance sensor 92.

Next, another contrast correction method according to a fourth exemplary embodiment is described below. The contrast correction method according to the fourth exemplary embodiment is characterized by using a reverse gamma conversion table whose shape is an S-shaped curve, instead of changing the reverse gamma value.

Figure 14:
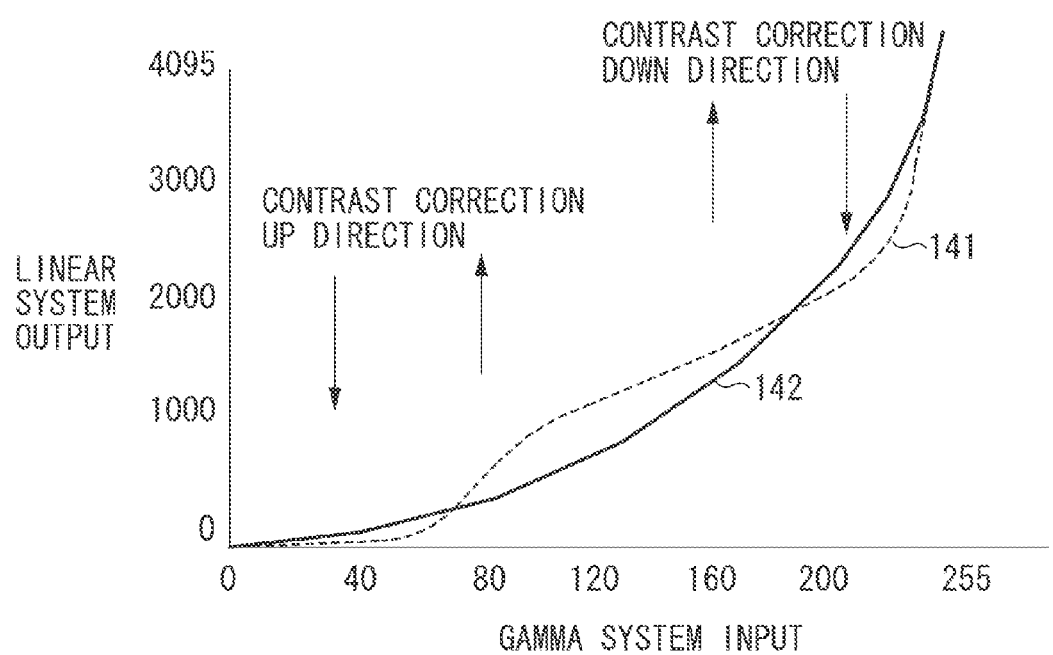
FIG. 14 is a graph illustrating details of a reverse gamma conversion table according to a fourth exemplary embodiment of the present disclosure.

FIG. 14 is a graph illustrating details of the reverse gamma conversion table according to the fourth exemplary embodiment. In FIG. 14, the abscissa axis represents the 256 gradation scale of the input gamma system gradation. The ordinate axis represents the 4096 gradation scale of the output linear system gradation. Further, in FIG. 14, a dotted curve 141 indicates a reverse gamma conversion table of the reverse gamma value 2.2 (i.e., initial value), and a solid curve 142 indicates an S-shaped reverse gamma conversion table.

According to the S-shaped reverse gamma conversion table 142 illustrated in FIG. 14, if a gradation value of the gamma system gradation defined by the 256 gradation scale is input, a corresponding gradation value of the linear system gradation defined by the 4096 gradation scale is output according to the S-shaped curve of the reverse gamma conversion table.

To perform the contrast correction processing in such a way as to enhance the contrast in response to a reduction of the averaged luminance within the visual field, the contrast can be increased by changing the reverse gamma conversion table from the curve of the ordinary reverse gamma value 2.2 to the S-shaped curve.

Next, a difference between the contrast to be obtained when the reverse gamma conversion table 141 of the reverse gamma value 2.2 is used and the contrast to be obtained when the S-shaped reverse gamma conversion table 142 is used is described in detail below. For example, when the input gradation value is the representative dark section gradation value 42, the gradation value to be output according to the reverse gamma conversion table 141 of the reverse gamma value 2.2 is the gradation value 77. On the other hand, the gradation value to be output according to the S-shaped reverse gamma conversion table 142 is a gradation value 40.

Further, when the input gradation value is the representative bright section gradation value 212, the gradation value to be output according to the reverse gamma conversion table 141 of the reverse gamma value 2.2 is the gradation value 2728. On the other hand, the gradation value to be output according to the S-shaped reverse gamma conversion table 142 is a gradation value 3400. The generation of the reverse gamma conversion table is performed in such a way as to be smoothly connected for another gradation values. When the ratio between the representative bright section gradation value and the representative dark section gradation value is referred to as "contrast", the contrast takes a numerical value of 35 when the reverse gamma conversion table 141 of the reverse gamma value 2.2 is used. The contrast takes a numerical value of 85 when the S-shaped reverse gamma conversion table 142 is used.

As mentioned above, it becomes feasible to obtain high contrast by generating an appropriate S-shaped reverse gamma conversion table in response to a reduction of the averaged luminance within the visual field.

As mentioned above, the image processing apparatus according to the above-mentioned exemplary embodiments perform contrast enhancement processing in response to a reduction of the averaged luminance within the visual field. However, according to a fine evaluation, the working ratio between the rod cell and the cone cell is variable depending on a gradation distribution (i.e., luminance distribution) of image data. More specifically, the rate of using the rod cell to see a low gradation portion of a screen is relatively high. On the other hand, the rate of using the cone cell to see a high gradation portion is relatively high.

Therefore, a contrast correction method according to a fifth exemplary embodiment of the present disclosure, which is characterized by increasing the contrast at the low gradation portion and reducing the contrast at the high gradation portion, is described in detail below.

Figure 15:
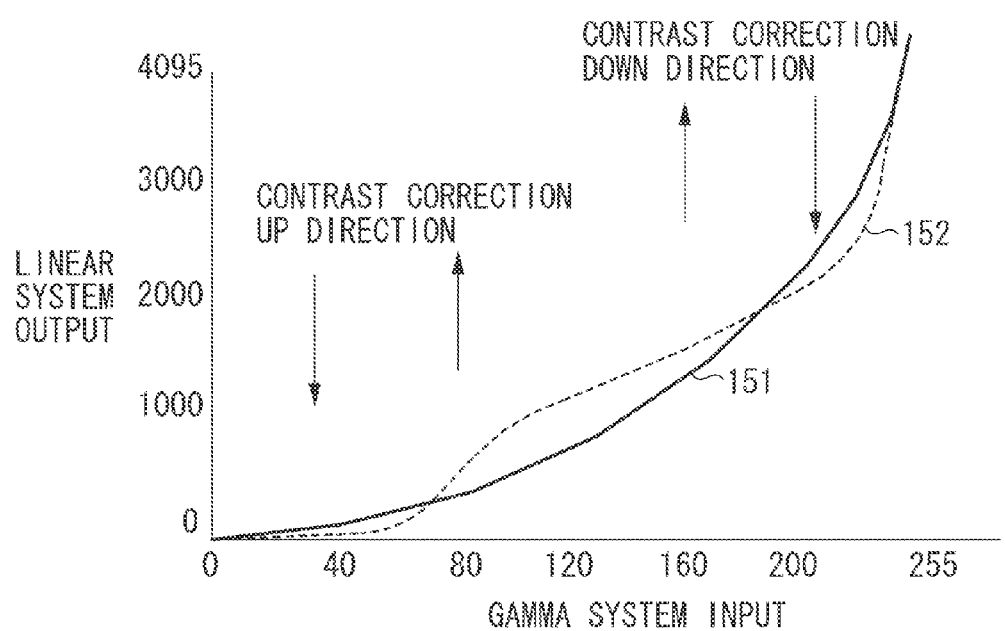
FIG. 15 is a graph illustrating details of a reverse gamma conversion table according to a fifth exemplary embodiment of the present disclosure.

FIG. 15 is a graph illustrating details of a reverse gamma conversion table according to a fifth exemplary embodiment. In FIG. 15, the abscissa axis represents the 256 gradation scale of the input gamma system gradation. The ordinate axis represents the 4096 gradation scale of the output linear system gradation. Further, in FIG. 15, a solid curve 151 indicates a reverse gamma conversion table of the reverse gamma value 2.2 (i.e., initial value), and a dotted curve 152 indicates a W-shaped reverse gamma conversion table.

In FIG. 15, the reverse gamma conversion table 151 of the reverse gamma value 2.2 is similar to the reverse gamma conversion table 141 illustrated in FIG. 14, in that when a gradation value of the gamma system gradation defined by the 256 gradation scale is input, a corresponding gradation value of the linear system gradation defined by the 4096 gradation scale is output.

Further, in FIG. 15, the W-shaped reverse gamma conversion table 152 is characterized in that the contrast increases along an S-shaped curve in the low gradation region equivalent to or lower than a central gradation value and the contrast decreases along a reversed S-shaped curve in the high gradation region equivalent to or higher than the central gradation value. Compared to the reverse gamma conversion table 151 of the reverse gamma value 2.2, the W-shaped reverse gamma conversion table 152 takes lower gradation values in the low gradation region, higher gradation values in the middle gradation region, and lower gradation values in the high gradation region. The shape of the W-shaped curve is similar to the letter "W" written in script.

If the W-shaped reverse gamma conversion table 152 is modified in such a way as to gradually depart from the curve of the reverse gamma conversion table 151 of the reverse gamma value 2.2 in response to a reduction of the averaged luminance within the visual field, the contrast of a dark portion increases and the contrast of a bright portion decreases.

There are differences between the contrast value to be obtained when the reverse gamma conversion table 151 of the reverse gamma value 2.2 is used and the contrast value to be obtained when the W-shaped reverse gamma conversion table 152, as described in detail below. Regarding the S-shaped reverse gamma conversion table 142, two representative gradation values used are the representative dark section gradation value 42 and the representative bright section gradation value 212. On the other hand, representative gradation values used for the W-shaped reverse gamma conversion table 152 are three of the representative dark section gradation value 42, the representative middle section gradation value 127, and the representative bright section gradation value 212.

For example, when the input gradation value is the representative dark section gradation value 42, the gradation value to be output according to the reverse gamma conversion table 151 of the reverse gamma value 2.2 is the gradation value 77. On the other hand, the gradation value to be output according to the W-shaped reverse gamma conversion table 152 is the gradation value 40. Further, when the input gradation value is the central representative gradation value 127, the gradation value to be output according to the reverse gamma conversion table 151 of the reverse gamma value 2.2 is a gradation value 884. On the other hand, the gradation value to be output according to the W-shaped reverse gamma conversion table 152 is a gradation value 1100. When the ratio between the representative middle section gradation value and the representative dark section gradation value is referred to as "dark section contrast", the dark section contrast takes a numerical value of 11 when the reverse gamma conversion table 151 of the reverse gamma value 2.2 is used. The dark section contrast takes a numerical value of 27 when the W-shaped reverse gamma conversion table 152 is used.

Further, when the input gradation value is the representative bright section gradation value 212, the gradation value to be output according to the reverse gamma conversion table 151 of the reverse gamma value 2.2 is the gradation value 2728. On the other hand, the gradation value to be output according to the W-shaped reverse gamma conversion table 152 is a gradation value 2100. When the ratio between the representative bright section gradation value and the representative middle section gradation value is referred to as "bright section contrast", the bright section contrast takes a numerical value of 3.1 when the reverse gamma conversion table 151 of the reverse gamma value 2.2 is used. The bright section contrast takes a numerical value of 1.9 when the W-shaped reverse gamma conversion table 152 is used. The generation of the W-shaped reverse gamma conversion table 152 is performed in such a way as to be smoothly connected for a portion corresponding to another gradation values.

As mentioned above, when the W-shaped reverse gamma conversion table is used, the dark section contrast increases from 11 to 27, and the bright section contrast decreases from 3.1 to 1.9. The entire contrast, i.e., the contrast derived from the ratio between the bright section gradation value and the dark section gradation value, takes a numerical value 53. The entire contrast value "53" is greater than the contrast value "35" obtained when the reverse gamma conversion table of the reverse gamma value 2.2 is used. Therefore, the correction can be performed in such a way as to enhance the contrast entirely.

As mentioned above, in the fifth exemplary embodiment, the W-shaped reverse gamma conversion table is generated to enhance the contrast in a low gradation portion and lower the contrast in a high gradation portion, in such a way as to increase the entire contrast, in response to a reduction of the averaged luminance within the visual field.

The present disclosure is not only applicable to a display apparatus but also applicable to an imaging apparatus that captures image data, a recording apparatus that records image data, and an image quality adjustment apparatus that is associated with the display apparatus. Hereinafter, an image quality adjustment apparatus according to an exemplary embodiment of the present disclosure is described in detail below with reference to FIGS. 16 and 17.

Figure 16:
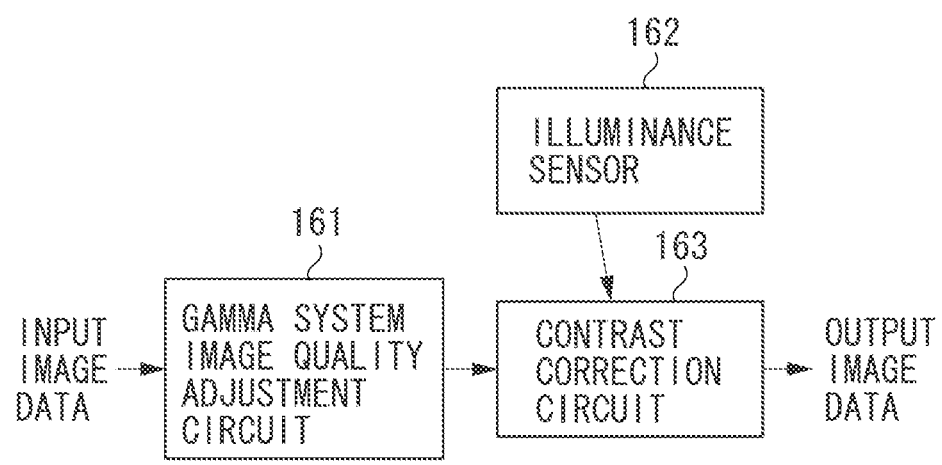
FIG. 16 illustrates a configuration of an image quality adjustment apparatus according to a sixth exemplary embodiment of the present disclosure.

FIG. 16 illustrates a configuration of an image quality adjustment apparatus according to a sixth exemplary embodiment of the present disclosure. In FIG. 16, a gamma system image quality adjustment circuit 161 can perform gamma system image quality correction processing on input image data. An illuminance sensor 162 can generate an illuminance signal. A contrast correction circuit 163 can correct the contrast of image data according to the averaged luminance within the visual field.

The above-mentioned input image data is gamma system image data, which is ordinarily multiplied with the gamma value 2.2. The above-mentioned input image data is subjected to the gamma system image processing (including enlargement and contraction) of the gamma system to be performed by the gamma system image quality adjustment circuit 161. Further, the image quality adjustment apparatus according to the present exemplary embodiment is equipped with the illuminance sensor 162 that can sense the ambient illuminance. The contrast correction circuit 163 calculates an averaged luminance within the visual field based on the image data output from the gamma system image quality adjustment circuit 161 and the illuminance information output from the illuminance sensor 162. Then, the contrast correction circuit 163 performs appropriate contrast correction processing based on the calculated averaged luminance within the visual field. The image data output from the contrast correction circuit 163 remains as gamma system image data. Therefore, the output image data can be displayed by a general display apparatus.

The contrast correction circuit 163 according to the sixth exemplary embodiment has a configuration similar to the contrast correction circuit 93 illustrated in FIG. 10, although the reverse gamma conversion table generation unit 104 is replaced by a contrast conversion table generation unit.

A contrast conversion table that can be generated by the above-mentioned contrast conversion table generation unit is described in detail below with reference to FIG. 17.

Figure 17:
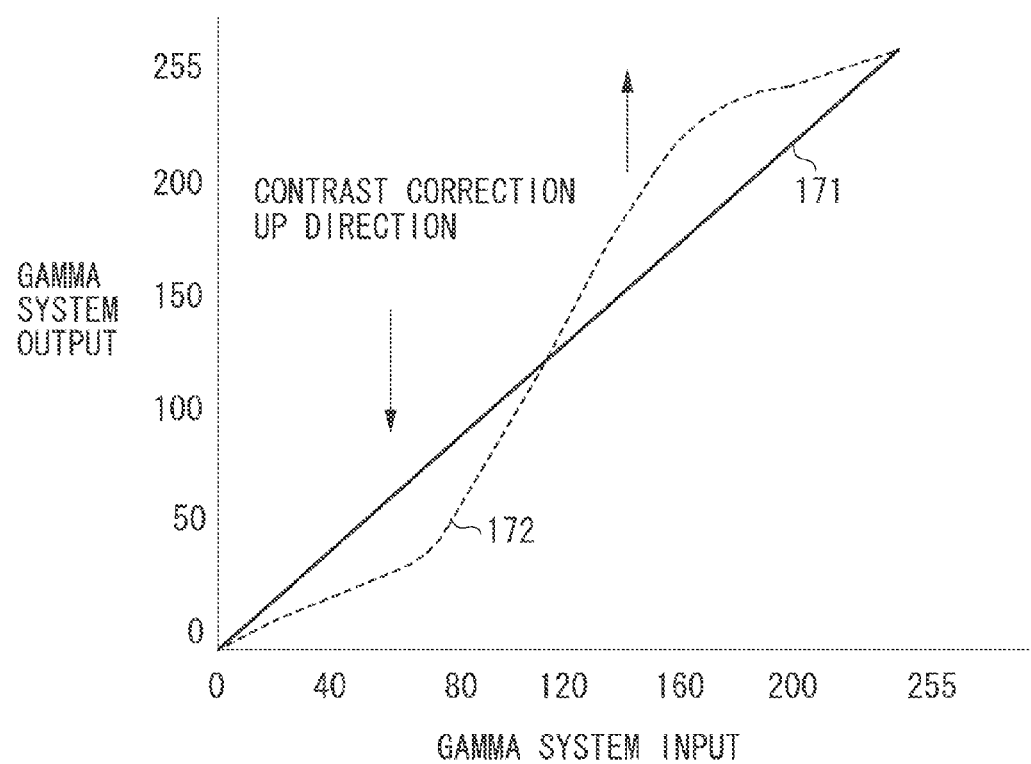
FIG. 17 is a graph illustrating details of a contrast correction table according to the sixth exemplary embodiment of the present disclosure.

FIG. 17 is a graph illustrating details of the contrast correction table according to the sixth exemplary embodiment. In FIG. 17, the abscissa axis represents the 256 gradation scale of the input gamma system gradation. The ordinate axis represents the 256 gradation scale of the gamma system output gradation. Further, in FIG. 17, a solid line 171 indicates a linear contrast correction table that is not subjected to initial value correction processing. A dotted curve 172 indicates an S-shaped contrast correction table.

In a case where no contrast correction processing is performed, the linear contrast correction table 171 can be used to directly output an input gradation value as an output gradation value. The linear contrast conversion table 171 can be changed to the S-shaped contrast conversion table 172 when the contrast correction processing is performed in such a way as to enhance the contrast in response to a reduction of the averaged luminance within the visual field.

Next, a difference between the contrast to be obtained when the linear contrast correction table 171 is used and the contrast to be obtained when the S-shaped contrast correction table 172 is used is described in detail below. For example, when the input gradation value is the representative dark section gradation value 42, the gradation value to be output according to the linear contrast correction table 171 is the same gradation value 42. On the other hand, the gradation value to be output according to the S-shaped contrast correction table 172 is a gradation value 32. It would be easy to understand if the above-mentioned values are normalized. More specifically, normalized linear values corresponding to the above-mentioned values are 0.0189 and 0.0104, respectively.

Further, when the input gradation value is the representative bright section gradation value 212, the gradation value to be output according to the linear contrast correction table 171 is the same gradation value 212. On the other hand, the gradation value to be output according to the S-shaped contrast correction table 172 is a gradation value 240. Normalized linear values corresponding to the above-mentioned values are 0.666 and 0.875, respectively. The generation of the S-shaped contrast correction table 172 is performed in such a way as to be smoothly connected for a portion corresponding to another gradation values. When the ratio between the representative bright section gradation value and the representative dark section gradation value is referred to as "contrast", the contrast takes a numerical value of 35 when the linear contrast correction table 171 is used.

The contrast takes a numerical value of 84 when the S-shaped contrast correction table 172 is used.

As mentioned above, it becomes feasible to obtain high contrast by generating an appropriate S-shaped reverse gamma conversion table in response to a reduction of the averaged luminance within the visual field.

Further, even in the image quality adjustment apparatus according to the present exemplary embodiment, it is useful to use a W-shaped contrast correction table according to which the contrast is enhanced at a dark portion and lowered at a bright portion of a screen to finely perform the adjustment in such a way as to correspond to the ratio between the photopic vision and the scotopic vision in a detailed portion of the screen, so that the image quality can be improved finely.

Next, a fine contrast correction method that can be realized by an image quality adjustment apparatus according to a seventh exemplary embodiment of the present disclosure, which is characterized by increasing the contrast in a low gradation portion and reducing the contrast in a high gradation portion, is described in detail below. A contrast conversion table to be generated by the contrast conversion table generation unit according to the seventh exemplary embodiment is different from the contrast conversion table to be generated by the contrast conversion table generation unit according to the sixth exemplary embodiment.

Figure 18:
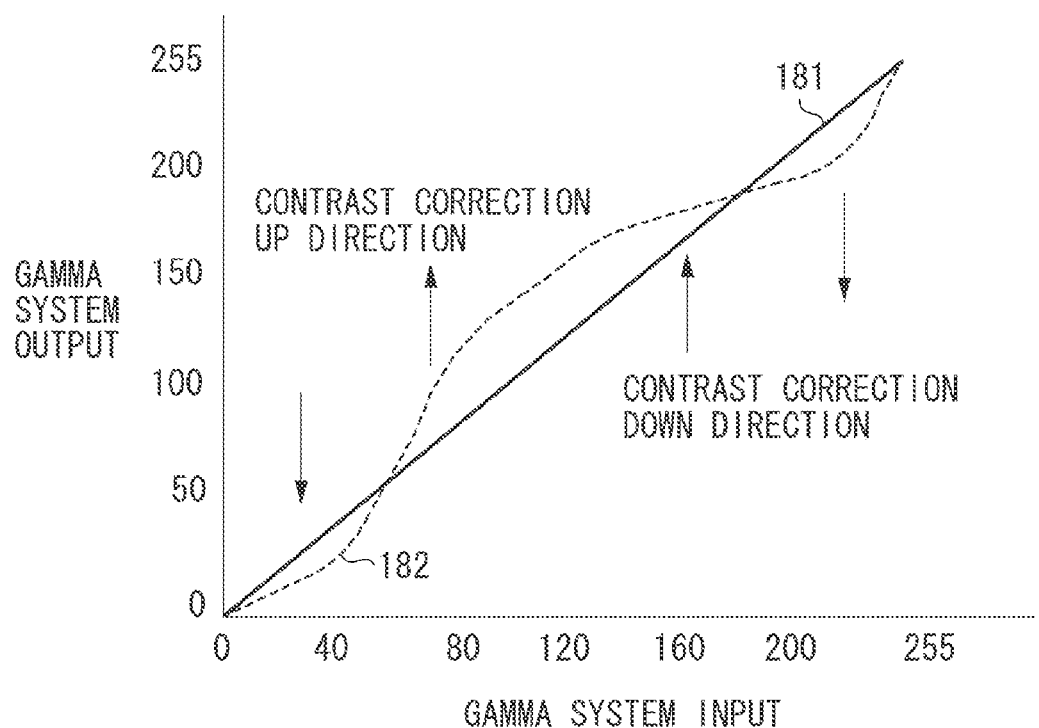
FIG. 18 is a graph illustrating details of a contrast conversion table according to a seventh exemplary embodiment of the present disclosure.

The contrast conversion table that can be generated by the contrast conversion table generation unit according to the seventh exemplary embodiment is described in detail below with reference to FIG. 18. FIG. 18 is a graph illustrating details of a contrast conversion table according to the seventh exemplary embodiment. In FIG. 18, the abscissa axis represents the 256 gradation scale of the input gamma system gradation. The ordinate axis represents the 256 gradation scale of the gamma system output gradation. Further, in FIG. 18, a solid line 181 indicates a linear contrast correction table that is not subjected to initial value correction processing. A dotted curve 182 indicates a W-shaped contrast correction table.

In a case where no contrast correction processing is performed, the linear contrast correction table 181 can be used to directly output an input gradation value as an output gradation value. The linear contrast conversion table 181 can be changed to the W-shaped contrast conversion table 182 when the contrast correction processing is performed in such a way as to enhance the contrast of the dark section and lower the contrast of the bright section in response to a reduction of the averaged luminance within the visual field.

The W-shaped contrast conversion table 182 is characterized in that the contrast increases along an S-shaped curve in the low gradation region equivalent to or lower than the central gradation value, and the contrast decreases along a reversed S-shaped curve in the high gradation region equivalent to or higher than the central gradation value. Compared to the linear contrast conversion table 181, the W-shaped contrast conversion table 182 takes lower gradation values in the low gradation region, higher gradation values in the middle gradation region, and lower gradation values in the high gradation region. The shape of the W-shaped curve 182 is similar to the letter "W" written in script.

Next, a difference between the contrast to be obtained when the linear contrast correction table 181 is used and the contrast to be obtained when the W-shaped contrast correction table 182 is used is described in detail below. For example, when the input gradation value is the representative dark section gradation value 42, the gradation value to be output according to the linear contrast correction table 181 is the same gradation value 42. On the other hand, the gradation value to be output according to the W-shaped contrast correction table 182 is the gradation value 32. It would be easy to understand if the above-mentioned values are normalized. More specifically, normalized linear values corresponding to the above-mentioned values are 0.0189 and 0.0104, respectively.

Further, when the input gradation value is the representative middle section gradation value 127, the gradation value to be output according to the linear contrast correction table 181 is the same gradation value 127. On the other hand, the gradation value to be output according to the W-shaped contrast correction table 182 is a gradation value 152. Normalized linear values corresponding to the above-mentioned values are 0.215 and 0.320, respectively.

Further, when the input gradation value is the representative bright section gradation value 212, the gradation value to be output according to the linear contrast correction table 181 is the same gradation value 212. On the other hand, the gradation value to be output according to the W-shaped contrast correction table 182 is a gradation value 190. Normalized linear values corresponding to the above-mentioned values are 0.666 and 0.523, respectively. The generation of the W-shaped contrast correction table is performed in such a way as to be smoothly connected for a portion corresponding to another gradation values.

When the ratio between the representative middle section gradation value and the representative dark section gradation value is referred to as "dark section contrast", the contrast takes a numerical value of 11 when the linear contrast correction table 181 is used. The contrast takes a numerical value of 31 when the W-shaped contrast correction table 182 is used. In other words, the dark section contrast increases to an upper level comparable to 2.8 times. Further, when the ratio between the representative bright section gradation value and the representative middle section gradation value is referred to as "bright section contrast", the contrast takes a numerical value of 3.1 when the linear contrast correction table 181 is used. The contrast takes a numerical value of 1.6 when the W-shaped contrast correction table 182 is used. In other words, the bright section contrast decreases to a lower level comparable to 0.52 times.

As mentioned above, it becomes feasible to finely change the contrast in the screen by generating a W-shaped contrast correction table that takes a higher contrast value in the dark section and a lower contrast value in the bright section in response to a reduction of the averaged luminance within the visual field.

The present disclosure is widely applicable to various display apparatuses, including a display device or a projector that is equipped with a liquid crystal or a plasma light-emitting elements or EL elements and an image quality adjustment apparatus connected to a display apparatus.

According to the present disclosure, it becomes feasible to correct the influence of the contrast derived from a difference between the photopic vision and the scotopic vision to provide an image excellent in image quality.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-098797 filed May 8, 2013, which is hereby incorporated by reference herein in its entirety.

What is claimed is:

1. An image processing apparatus comprising:
    an image acquisition unit configured to acquire image data;
    a brightness acquisition unit configured to acquire brightness information relating to ambient brightness of a display area of an image based on the image data;
    a control unit configured to control contrast of the image data acquired by the image acquisition unit, by using the brightness information acquired by the brightness acquisition unit, such that contrast corresponding to a first range of gradation values is higher in a first case where brightness information indicating a brightness lower than a predetermined brightness is acquired by the brightness acquisition unit in comparison with a second case where brightness information indicating a brightness higher than the predetermined brightness is acquired by the brightness acquisition unit, and such that contrast corresponding to a second range of gradation values is lower in the first case in comparison with the second case, wherein gradation values of the first range is less than the gradation values of the second range; and
    a display control unit configured to display an image based on the image data whose contrast has been controlled by the control unit.

2. The image processing apparatus according to claim 1, wherein the control unit is configured to control the contrast of the image data acquired by the image acquisition unit by controlling a value relating to gamma correction.

3. The image processing apparatus according to claim 1, wherein the brightness acquisition unit is further configured to acquire an averaged luminance value of a plurality of image frames acquired by the image acquisition unit, as second brightness information, and
    wherein the control unit controls the contrast of the image data acquired by the image acquisition unit, by using the brightness information and the second brightness information acquired by the brightness acquisition unit.

4. The image processing apparatus according to claim 1, further comprising:
    a table configured to associate the brightness information acquired by the brightness acquisition unit with a parameter relating to a control amount of the contrast, and
    wherein the control unit is configured to control the contrast by referring to the table.

5. The image processing apparatus according to claim 1, wherein when the control unit performs a control to enhance the contrast of the first range of gradation values, a ratio between an output gradation value corresponding to a maximum input gradation value of the first range and an output gradation value corresponding to a minimum input gradation value of the first range becomes greater, compared to a case where the control unit does not perform the control to enhance the contrast of the first range.

6. A method for causing an image processing apparatus to perform image processing, the method comprising:
    acquiring image data;
    acquiring brightness information relating to ambient brightness of a display area of an image based on the image data;
    controlling contrast of the acquired image data by using the acquired brightness information, such that contrast corresponding to a first range of gradation values is higher in a first case where brightness information indicating a brightness lower than a predetermined brightness is acquired as the brightness information in comparison with a second case where brightness information indicating a brightness higher than the predetermined brightness is acquired as the brightness information, and such that contrast corresponding to a second range of gradation values is lower in the first case in comparison with the second case, wherein gradation values of the first range is less than the gradation values of the second range; and
    displaying an image based on the image data whose contrast has been controlled in the controlling.

7. The image processing method according to claim 6, wherein an averaged luminance value of a plurality of acquired image frames is acquired as second brightness information, and
    wherein the contrast of the acquired image data is controlled by using the acquired brightness information and the acquired second brightness information.

8. A non-transitory storage medium storing a computer-readable program that causes a computer to perform a method comprising:
    acquiring image data;
    acquiring brightness information relating to ambient brightness of a display area of an image based on the image data;
    controlling contrast of the acquired image data by using the acquired brightness information, such that contrast corresponding to a first range of gradation values is higher in a first case where brightness information indicating a brightness lower than a predetermined brightness is acquired as the brightness information in comparison with a second case where brightness information indicating a brightness higher than the predetermined brightness is acquired as the brightness information, and such that contrast corresponding to a second range of gradation values is lower in the first case in comparison with the second case, wherein gradation values of the first range is less than the gradation values of the second range; and
    displaying an image based on the image data whose contrast has been controlled in the controlling.

9. The non-transitory storage medium according to claim 8, wherein an averaged luminance value of a plurality of acquired image frames is acquired as second brightness information, and
wherein the contrast of the acquired image data is controlled by using the acquired brightness information and the acquired second brightness information.

10. An image processing apparatus comprising:
an image acquisition unit configured to acquire image data;
a brightness acquisition unit configured to acquire brightness information relating to both ambient brightness of a display area of an image based on the image data and brightness of the image data;
a control unit configured to control contrast of the image data acquired by the image acquisition unit, by using the brightness information acquired by the brightness acquisition unit, such that the contrast corresponding to the image data is higher in a case where brightness information indicating a brightness lower than a predetermined brightness is acquired by the brightness acquisition unit in comparison with a case where brightness information indicating a brightness higher than the predetermined brightness is acquired by the brightness acquisition unit; and
a display control unit configured to display an image based on the image data whose contrast has been controlled by the control unit.

11. The image processing apparatus according to claim 10, wherein the control unit is configured to control the contrast of the image data based on both of the brightness information and size of the display area in which the image can be displayed based on the image data.

12. The image processing apparatus according to claim 10, wherein the brightness acquisition unit is configured to acquire the brightness information based on gradation values of the image data and an output of an illuminance sensor.

13. An image processing method comprising:
acquiring image data;
acquiring brightness information relating to both ambient brightness of a display area of an image based on the image data and brightness of the image data;
controlling contrast of the acquired image data, by using the acquired brightness information relating to both the ambient brightness of the display area and the brightness of the image data such that the contrast corresponding to the image data is higher in a case where brightness information indicating a brightness lower than a predetermined brightness is acquired in the acquiring in comparison with a case where brightness information indicating a brightness higher than the predetermined brightness is acquired in the acquiring; and
displaying an image based on the image data whose contrast has been controlled in the controlling.

14. The image processing method according to claim 13, wherein the controlling controls the contrast of the image data based on both of the brightness information and size of the display area in which the image can be displayed based on the image data.

15. The image processing method according to claim 13, wherein the acquiring brightness information acquires the brightness information based on gradation values of the image data and an output of an illuminance sensor.

16. The non-transitory storage medium according to claim 8, wherein the controlling controls the contrast of the image data based on both of the brightness information and size of the display area in which the image can be displayed based on the image data.

17. The non-transitory storage medium according to claim 8, wherein the acquiring brightness information acquires the brightness information based on gradation values of the image data and an output of an illuminance sensor.

18. The image processing apparatus according to claim 5, wherein
the maximum input gradation value of the first range is a middle value of capable gradation values, and wherein
the minimum input gradation value of the first range is greater than a minimum value of the capable gradation values.

19. The image processing apparatus according to claim 10, wherein
the brightness acquisition unit acquires the brightness information based on both average gradation value of all pixels of the image data and an output of an illuminance sensor.

* * * * *